(12) United States Patent
Sugiura et al.

(10) Patent No.: US 8,797,616 B2
(45) Date of Patent: Aug. 5, 2014

(54) CONVERSION TABLE COMPRESSION METHOD AND PROGRAM

(71) Applicant: Canon Kabushiki Kaisah, Tokyo (JP)

(72) Inventors: Hiroaki Sugiura, Kanagawa-ken (JP); Kazuyoshi Sumiuchi, Kanagawa-ken (JP); Koji Ito, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/724,726

(22) Filed: Dec. 21, 2012

(65) Prior Publication Data

US 2013/0114094 A1    May 9, 2013

Related U.S. Application Data

(63) Continuation of application No. 11/676,015, filed on Feb. 16, 2007, now Pat. No. 8,363,292.

(30) Foreign Application Priority Data

Feb. 20, 2006  (JP) ................................. 2006-043160

(51) Int. Cl.
   *H04N 1/46*    (2006.01)
(52) U.S. Cl.
   USPC ............................. 358/523; 358/518; 358/1.9
(58) Field of Classification Search
   USPC ....................................................... 358/523
   See application file for complete search history.

(56) References Cited

U.S. PATENT DOCUMENTS

| | | | | |
|---|---|---|---|---|
| 5,583,656 | A | | 12/1996 | Gandhi et al. ................ 358/426 |
| 5,835,034 | A | * | 11/1998 | Seroussi et al. ................ 341/65 |
| 6,453,332 | B1 | | 9/2002 | Shyu ............................. 708/607 |
| 7,826,111 | B2 | * | 11/2010 | Won et al. ..................... 358/518 |
| 8,294,953 | B2 | * | 10/2012 | Shaw et al. .................. 358/3.23 |
| 8,526,062 | B2 | * | 9/2013 | Klassen ....................... 358/3.23 |
| 2002/0021321 | A1 | * | 2/2002 | Nakajima et al. .............. 347/19 |

FOREIGN PATENT DOCUMENTS

| | | |
|---|---|---|
| GB | 1595122 | 8/1981 |
| JP | 53-123201 A | 10/1978 |
| JP | 55-049279 A | 4/1980 |
| JP | 11-017971 A | 1/1999 |
| JP | 2002-209114 A | 7/2002 |
| JP | 2003-110869 A | 4/2003 |
| JP | 2003-271945 A | 9/2003 |

* cited by examiner

*Primary Examiner* — Mark Zimmerman
*Assistant Examiner* — Lawrence Wills
(74) *Attorney, Agent, or Firm* — Fitzpatrick, Cella, Harper & Scinto

(57) ABSTRACT

This invention relates to a conversion table compression method of compressing a conversion table and storing the conversion table in a storage medium, including an axial difference creating step of creating an axial difference table by calculating, from data stored in the conversion table, the difference values between grid points adjacent in predetermined directions along a plurality of axes which define the input space of the conversion table, a compressing step of compressing the axial difference table to create compressed data, and a storing step of storing the compressed data in a recording medium.

4 Claims, 42 Drawing Sheets

FIG. 25

| ID | DATA AMOUNT OF COMPRESSED LUT |
|---|---|
| 1 | 2672 |
| 2 | 3024 |
| 3 | 2422 |
| ⋮ | ⋮ |
| 8 | 1795 |
| 9 | 1932 |
| 10 | 2432 |
| ⋮ | ⋮ |
| E-2 | 2188 |
| E-1 | 1528 |
| E | 2865 |

| | 2601 | 2602 | 2603 |
|---|---|---|---|
| C[0] | Ca[0:0:0] | Cb[0:0:0] | Cab[0:0:0] |
| C[1] | Ca[0:0:1] | Cb[0:0:1] | Cab[0:0:1] |
| C[2] | Ca[0:0:2] | Cb[0:0:2] | Cab[0:0:2] |
| C[3] | Ca[0:0:3] | Cb[0:0:3] | Cab[0:0:3] |
| C[4] | Ca[0:0:4] | Cb[0:0:4] | Cab[0:0:4] |
| C[5] | Ca[0:0:5] | Cb[0:0:5] | Cab[0:0:5] |
| C[6] | Ca[0:0:6] | Cb[0:0:6] | Cab[0:0:6] |
| C[7] | Ca[0:1:0] | Cb[0:1:0] | Cab[0:1:0] |
| C[8] | Ca[0:1:1] | Cb[0:1:1] | Cab[0:1:1] |
| C[9] | Ca[0:1:2] | Cb[0:1:2] | Cab[0:1:2] |
| C[10] | Ca[0:1:3] | Cb[0:1:3] | Cab[0:1:3] |
| C[11] | Ca[0:1:4] | Cb[0:1:4] | Cab[0:1:4] |
| C[12] | Ca[0:1:5] | Cb[0:1:5] | Cab[0:1:5] |
| C[13] | Ca[0:1:6] | Cb[0:1:6] | Cab[0:1:6] |
| C[14] | Ca[0:2:0] | Cb[0:2:0] | Cab[0:2:0] |
| C[15] | Ca[0:2:1] | Cb[0:2:1] | Cab[0:2:1] |
| C[16] | Ca[0:2:2] | Cb[0:2:2] | Cab[0:2:2] |
| C[17] | Ca[0:2:3] | Cb[0:2:3] | Cab[0:2:3] |
| C[18] | Ca[0:2:4] | Cb[0:2:4] | Cab[0:2:4] |
| C[19] | Ca[0:2:5] | Cb[0:2:5] | Cab[0:2:5] |
| C[20] | Ca[0:2:6] | Cb[0:2:6] | Cab[0:2:6] |
| C[21] | Ca[1:0:0] | Cb[1:0:0] | Cab[1:0:0] |
| C[22] | Ca[1:0:1] | Cb[1:0:1] | Cab[1:0:1] |
| C[23] | Ca[1:0:2] | Cb[1:0:2] | Cab[1:0:2] |
| C[24] | Ca[1:0:3] | Cb[1:0:3] | Cab[1:0:3] |
| C[25] | Ca[1:0:4] | Cb[1:0:4] | Cab[1:0:4] |
| C[26] | Ca[1:0:5] | Cb[1:0:5] | Cab[1:0:5] |
| C[27] | Ca[1:0:6] | Cb[1:0:6] | Cab[1:0:6] |
| C[28] | Ca[1:1:0] | Cb[1:1:0] | Cab[1:1:0] |
| C[29] | Ca[1:1:1] | Cb[1:1:1] | Cab[1:1:1] |
| C[30] | Ca[1:1:2] | Cb[1:1:2] | Cab[1:1:2] |
| C[31] | Ca[1:1:3] | Cb[1:1:3] | Cab[1:1:3] |
| C[32] | Ca[1:1:4] | Cb[1:1:4] | Cab[1:1:4] |
| C[33] | Ca[1:1:5] | Cb[1:1:5] | Cab[1:1:5] |
| C[34] | Ca[1:1:6] | Cb[1:1:6] | Cab[1:1:6] |
| C[35] | Ca[1:2:0] | Cb[1:2:0] | Cab[1:2:0] |
| C[36] | Ca[1:2:1] | Cb[1:2:1] | Cab[1:2:1] |
| C[42] | Ca[2:0:0] | Cb[2:0:0] | Cab[2:0:0] |
| C[63] | Ca[3:0:0] | Cb[3:0:0] | Cab[3:0:0] |
| C[84] | Ca[4:0:0] | Cb[4:0:0] | Cab[4:0:0] |
| C[104] | Ca[4:2:6] | Cb[4:2:6] | Cab[4:2:6] |

FIG. 32

| ID OF TARGET LUT | STATUS VALUE | DATA AMOUNT OF COMPRESSED LUT | ADDRESS OF COMPRESSED LUT |
|---|---|---|---|
| 1 | 9 | 2832 | ADDRESS |
| 2 | -1 | 2342 | ADDRESS |
| 3 | 0 | 1973 | ADDRESS |
| ⋮ | ⋮ | ⋮ | ⋮ |
| 8 | 5 | 3978 | ADDRESS |
| 9 | -1 | 1727 | ADDRESS |
| 10 | 0 | 2987 | ADDRESS |
| ⋮ | ⋮ | ⋮ | ⋮ |
| E-2 | -1 | 1645 | ADDRESS |
| E-1 | 0 | 2132 | ADDRESS |
| E | -1 | 1874 | ADDRESS |

FIG. 33

| TARGET LUT | REFERENCE LUT | DATA AMOUNT DIFFERENCE |
|---|---|---|
| 1 | 2 | 324 |
| 1 | 3 | -76 |
| 1 | 4 | 12 |
| ⋮ | ⋮ | ⋮ |
| 1 | E | 48 |
| 2 | 1 | 282 |
| 2 | 3 | 7 |
| ⋮ | ⋮ | ⋮ |
| E | E-3 | -125 |
| E | E-2 | -56 |
| E | E-1 | 732 |

F I G. 35B
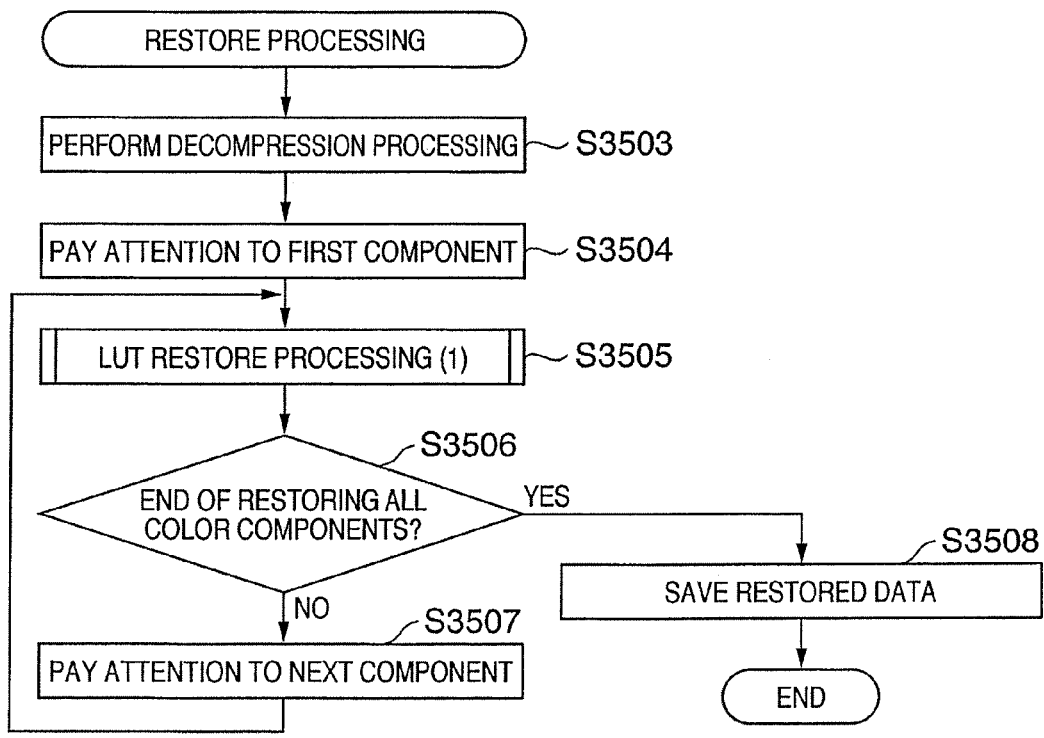

CONVERSION TABLE COMPRESSION METHOD AND PROGRAM

CROSS REFERENCE TO RELATED APPLICATION

This application is a continuation of U.S. application Ser. No. 11/676,015 filed on Feb. 16, 2007, the entire disclosure of which is incorporated by reference herein.

BACKGROUND OF THE INVENTION

1. Field of the Invention

The present invention relates to a conversion table compression method used for color conversion of an image and the like. More specifically, the present invention relates to a conversion table used to process image data by a color image processing apparatus, especially, a method of reducing a storage capacity necessary to store a color conversion table, and an image processing apparatus which converts a conversion table into data suitable for storage or processes an image using a stored conversion table.

2. Description of the Related Art

Apparatuses such as a color printer, color copying machine, and color scanner which input/output a color image need to perform color conversion processing highly optimized on the basis of human perception and the like in order to provide a high-quality color image. It is difficult to achieve color conversion processing by simple calculation, so conversion processing is done using a lookup table (to be referred to as an LUT hereinafter) capable of implementing conversion processing with a high degree of freedom. The LUT is a kind of conversion table, and holds an output value corresponding to an input in the table. The LUT requires a large storage capacity to hold output data corresponding to all conceivable inputs. In general, the LUT holds output data (called the values of grid points) corresponding to discrete specific inputs (called grid points), and output data to an input other than grid points is calculated by interpolation using the values of the grid points.

For example, the most popular color conversion processing for input data of 8 bits (0 to 255) for each of R (Red), G (Green), and B (Blue) and output data of 8 bits for each of C (Cyan), M (Magenta), Y (Yellow), and K (blacK) will be examined. The LUT used for this conversion is a three-dimensional table whose coordinate axes are R, G, and B, and contains Y, M, C, and K values as elements in correspondence with R, G, and B values. In this case, input data (R, G, and B) may take about 1,6700,000 values from 0h to FFFFFFh. The LUT used for this color conversion must store about 1,6700,000×4 bytes=about 64-Mbyte data.

To reduce the data amount, grid points are set at specific inputs, e.g., R, G, and B values "0, 64, 128, 191, and 255". The LUT saves Y, M, C, and K values corresponding to these grid points as the values of the grid points. For example, input data serving as grid points are (0,0,0), (128,191,64), (64,255,128), and the like. The LUT holds output data as grid point values corresponding to these grid points. When the LUT holds output data corresponding to given input data, a position specified by the input data in the LUT is called a grid point. The value of output data held in the LUT in correspondence with the input data is called the value of a grid point. Output data corresponding to input data such as (128,200,64) other than grid points is generally calculated from the weighted average of grid point values in accordance with distances from grid points. Calculating output data from the weighted average of grid point values is called interpolation. Various interpolation methods are proposed (see patent reference 4 and the like).

The number of grid points represents that of grid points along each coordinate axis (also simply called an axis) of the LUT. In the above example, the number of grid points is 5 along each axis. The values of input data corresponding to grid points along each axis are called the positions of grid points. In the above example, the positions of grid points are 0, 64, 128, 191, and 255. Numbers assigned to the positions of grid points in the ascending order are called grid point numbers. In the above example, the grid point number of grid point position 0 is 0, and that of grid point position 191 is 3. The number of grid points and their positions are equal between the axes in the above example, but may be different between them. To calculate output data corresponding to input data other than grid points by interpolation, the LUT must hold at least grid points corresponding to the minimum and maximum values of input data, so the minimum number of grid points is 2.

Recently, image processing apparatuses such as an inkjet printer achieve higher image qualities than that of a silver halide photograph, and need to support a larger number of paper types for a broader application purpose. To provide higher image qualities, image processing apparatuses need to perform high-precision color conversion processing. To support many paper types, a color conversion table optimal for each paper type is necessary. The number of color conversion tables used in one image processing apparatus further increases. When executing color conversion processing at high precision using interpolation together with a color conversion table, one effective method is to increase the number of grid points in the color conversion table and decrease the distance between each grid point and input data used in interpolation. However, as the number of grid points increases (i.e., the table becomes larger), the data amount of one LUT greatly increases. These factors increase the data amount of the color conversion table more and more, wasting resources such as a memory used to store the data.

Data compression is known as a technique of making a relatively large amount of data fall within a limited resource. However, a direct application of known data compression to compression of a color conversion table cannot satisfactorily reduce the data amount, i.e., cannot increase the compression ratio. General lossless compression processing reduces the data amount using frequent reappearance of the same data. The compression ratio is high for data which appears at high frequency, but is low for data which appears at low frequency. The color conversion table is expressed as a set of values which change smoothly but nonlinearly due to color continuity. Although the value of the color conversion table changes smoothly along with change of the input, the change is not regular and values are distributed in a wide range without any deviation. It is, therefore, difficult to increase the compression ratio of the color conversion table. Lossy compression processing loses data, is not proper to increase the image quality, and is not preferably used to compress the color conversion table.

For this reason, no high compression ratio can be attained even by applying various known compression algorithms. To solve this problem, there are proposed several methods of increasing the compression ratio of the color conversion table by converting a color conversion table before compression processing (see patent references 1 to 3 and the like). As the compression method, U.S. Pat. No. 4,558,302 discloses an LZW compression method.

[Patent Reference 1] Japanese Patent Laid-Open No. 11-017971

[Patent Reference 2] Japanese Patent Laid-Open No. 2002-209114

[Patent Reference 3] Japanese Patent Laid-Open No. 2003-110869

[Patent Reference 4] Japanese Patent Laid-Open No. 53-123201

However, several faults have been pointed out in the proposed methods of converting a color conversion table before compression. For example, (1) an increase in compression ratio is not sufficient. (2) No method is applicable unless the color conversion table satisfies predetermined conditions. (3) Since each color conversion table is individually processed, the compression ratio of each color conversion table does not change even upon an increase in the number of color conversion tables, and the total data amount of compressed color conversion tables also increases at the same rate as the increase in the number of color conversion tables.

Demand arises for a more efficient, general-purpose compression method in order to solve these faults and reduce the capacity of the conversion table.

SUMMARY OF THE INVENTION

The present invention has been made in consideration of the above situation, and has as its object to solve the above-mentioned faults. More specifically, it is an object of the present invention to provide a color conversion table storage method which is applicable to any color conversion table when compressing and storing data of a color conversion table, and can increase the compression ratio as the number of color conversion tables increases.

To solve the above problems, the present invention comprises the following steps. That is, a conversion table compression method of compressing a conversion table and storing the conversion table in a storage medium comprises an axial difference creating step of creating an axial difference table by calculating, from data stored in the conversion table, difference values between grid points adjacent in predetermined directions along a plurality of coordinate axes which define an input parameter space of the conversion table, a compressing step of compressing the axial difference table to create compressed data, and a storing step of storing the compressed data in a recording medium.

A conversion table compression method of compressing a conversion table and storing the conversion table in a storage medium comprises a thinning-out step of thinning out, from a first conversion table, an element which forms the first conversion table, thereby creating a second conversion table, a hierarchic difference creating step of creating a hierarchic difference table corresponding to the thinned-out element by calculating a difference between a value of the element thinned out from the first conversion table in the thinning-out step, and an interpolation value obtained from the second conversion table in correspondence with the thinned-out element, a compressing step of compressing concatenated data obtained by concatenating the second conversion table to the hierarchic difference table, thereby creating compressed data, and a storing step of storing the compressed data in a recording medium.

A conversion table compression method of compressing a conversion table and storing the conversion table in a storage medium comprises a table difference creating step of creating an inter-table difference table by calculating difference data between data stored in a first conversion table and data stored in a second conversion table identical in structure to the first conversion table, a compressing step of compressing the inter-table difference table to generate compressed data, and a storing step of storing, in a recording medium, the compressed data and information representing that the first conversion table is converted into the inter-table difference table between the first conversion table and the second conversion table.

A conversion table compression method of compressing a conversion table and storing the conversion table in a storage medium comprises an axial difference creating step of creating axial difference tables for a plurality of conversion tables by calculating, from data stored in the conversion tables, difference values between grid points adjacent in predetermined directions along a plurality of coordinate axes which define an input parameter space of the conversion table, a table difference creating step of creating an inter-table difference table by calculating difference data from data stored in a second axial difference table identical in structure to a first conversion table among the axial difference tables created in the axial difference creating step, a compressing step of compressing the inter-table difference table to create compressed data, and a storing step of storing, in a recording medium, the compressed data and information representing that the first conversion table is converted into difference data between the first conversion table and a second conversion table.

A conversion table compression method of compressing a conversion table and storing the conversion table in a storage medium comprises a thinning-out step of thinning out, from a first conversion table, an element which forms the first conversion table, thereby creating a second conversion table, a hierarchic difference creating step of creating a hierarchic difference table corresponding to the thinned-out element by calculating a difference between a value of the element thinned out from the first conversion table in the thinning-out step, and an interpolation value obtained from the second conversion table in correspondence with the thinned-out element, a concatenating step of creating concatenated data by concatenating the second conversion table to the hierarchic difference table, a table difference generating step of generating an inter-table difference table by calculating difference data between first concatenated data created in the concatenating step and second concatenated data identical in structure to the first concatenated data, a compressing step of compressing the inter-table difference table to generate compressed data, and a step of storing, in a recording medium, the compressed data and information representing that the first concatenated data is converted into the inter-table difference table between the first concatenated data and the second concatenated data.

A conversion table compression method of compressing a conversion table and storing the conversion table in a storage medium comprises a thinning-out step of thinning out, from a first conversion table, an element which forms the first conversion table, thereby creating a second conversion table, a hierarchic difference creating step of creating a hierarchic difference table corresponding to the thinned-out element by calculating a difference between a value of the element thinned out from the first conversion table in the thinning-out step, and an interpolation value obtained from the second conversion table in correspondence with the thinned-out element, an axial difference creating step of creating an axial difference table by calculating, from data stored in the second conversion table, difference values between grid points adjacent in predetermined directions along a plurality of coordinate axes which define an input parameter space of the second conversion table, a step of concatenating the axial difference table and the hierarchic difference table into concatenated data, a compressing step of creating compressed data, and a storing step of storing the compressed data in a recording medium.

Further features of the present invention will become apparent from the following description of exemplary embodiments (with reference to the attached drawings).

BRIEF DESCRIPTION OF THE DRAWINGS

FIG. 25 is a view showing list A in the first processing;

FIG. 26 is a view of exploding the difference between triaxial LUTs into a one-dimensional table;

FIG. 32 is a view showing an LUT management table in the second processing;

FIG. 33 is a view showing list A in the second processing;

FIG. 35B is a main flowchart of LUT decoding procedures;

DESCRIPTION OF THE EMBODIMENTS

Figure 1:
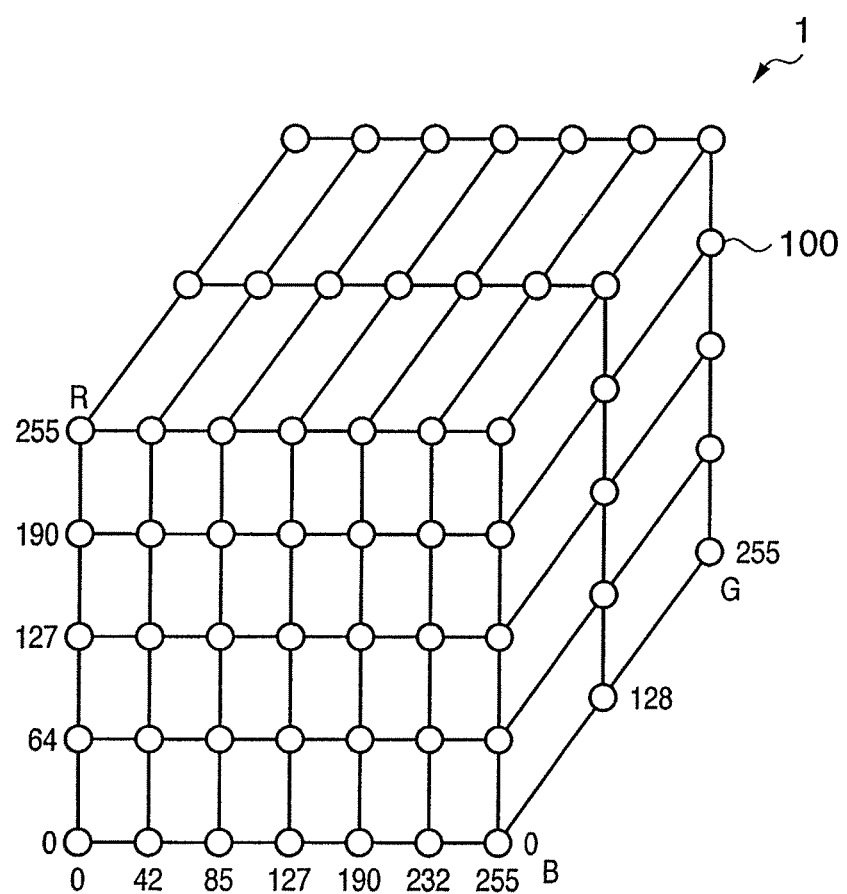
FIG. 1 is a perspective view schematically showing a triaxial LUT.

Preferred embodiments of the present invention will be described in detail below with reference to the accompanying drawings. The structure of a lookup table (to be referred to as an LUT hereinafter) common to all embodiments will be explained. The LUT is a three-dimensional table which outputs one or more data in response to input data formed from three elements. The three-dimensional table is schematically expressible as a rectangular parallelepiped as shown in FIG. 1. Letting the origin be one corner of the rectangular parallelepiped, three edges which form the corner serve as input axes, and the values of three elements of input data correspond to distances from the corner. Each grid point has a value. A conversion table 1 has grid points 100 each having a grid point value which is output data to regularly sampled input data. Although not shown in FIG. 1, grid points are regularly arrayed on three hidden planes of the rectangular parallelepiped and in its inside, and the rectangular parallelepiped has a total of 105 grid points. In the following embodiments, the conversion table is a color conversion table which receives luminance data of three, R, G, and B components and outputs density data of four, C, M, Y, and K components. Assumable input data is data defined in an input color space such as CMY, L*a*b*, or XYZ in addition to RGB. The present invention is also applicable to another color space data as far as each of three elements falls within a finite range.

Also, the output color space is not limited to the YMCK color space. The embodiments are also applicable to any input color space which is not three-dimensional and any output color space which is not four-dimensional, like a color table for converting Y, M, C, and K into R, G, and B. The embodiments are also applicable to general conversion tables in which the output value changes smoothly along with change of input data but the change is nonlinear and no compression yields high compression ratio, similar to the color conversion table. A color conversion table which receives R, G, and B data and outputs Y, M, C, and K data will be described.

Figure 2:
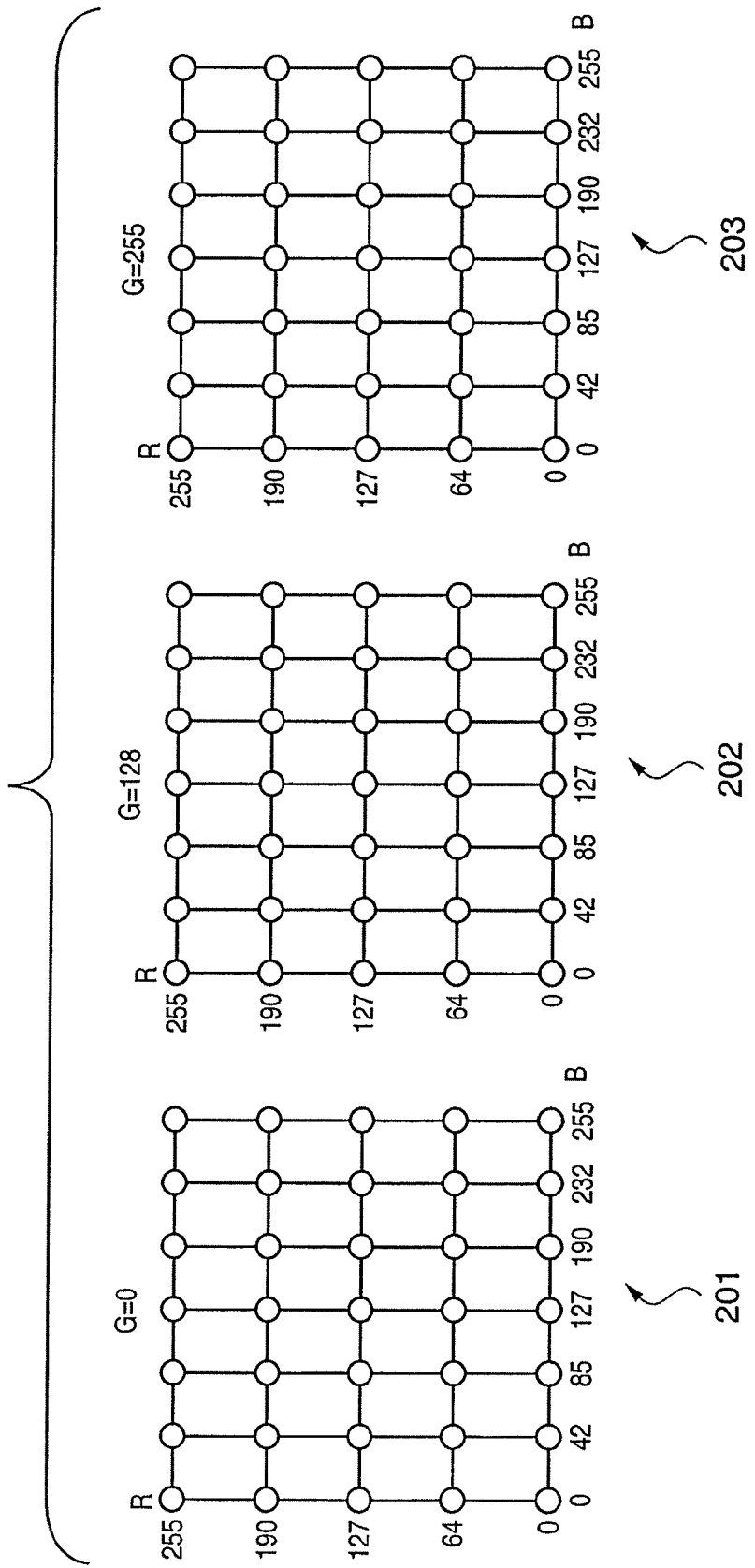
FIG. 2 is a two-dimensionally exploded view of the triaxial LUT.

The three-dimensional table shown in FIG. 1 is also schematically expressible by separating one element of input data at each grid point position, and two-dimensionally arranging two remaining elements along the ordinate and abscissa axes, as represented by tables 201 to 203 in FIG. 2. This conversion table independently holds output data components, that is, outputs one value in response to an input of three elements. For example, a conversion table which receives R, G, and B values and outputs four, C, M, Y, and K values is formed from a set of four conversion tables which give C, M, Y, and K values in accordance with R, G, and B values. For example, the C value is determined by only input, R, G, and B values, i.e., C=Fc(R,G,B) (Fc means a map of the C component on the basis of the conversion table). Similarly, M=Fm(R,G,B), Y=Fy(R,G,B), and K=Fk(R,G,B). The grid point positions of the respective color components in the LUT are generally common to each other. Processing in the embodiments is applicable individually to each component regardless of the number of dimensions of output data of the target conversion table. In the following description, output data is one-dimensional.

Figure 3:
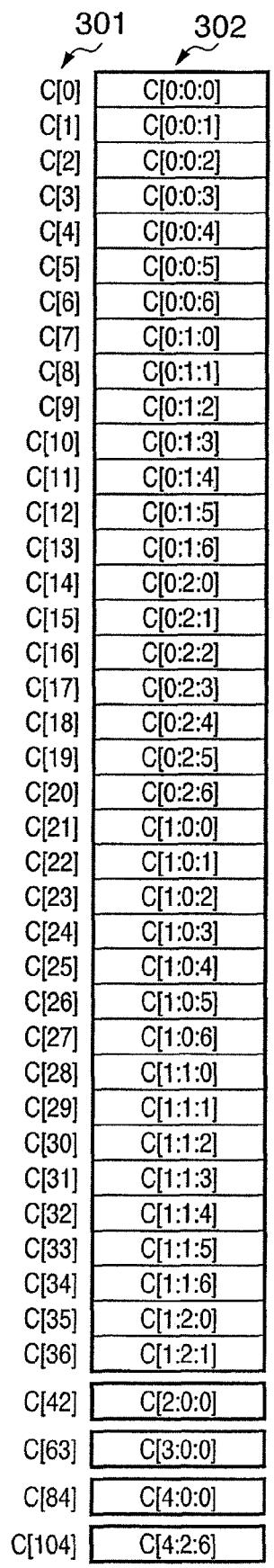
FIG. 3 is a view of exploding the triaxial LUT into a one-dimensional table.

In the following description, an LUT C[i:j:k] will be exemplified. The values of all grid points are positive and each represented by 8 bits. By determining grid point numbers on the respective axes, the position of a grid point in the three-dimensional space is finalized. [i:j:k] represents a grid point whose R, G, and B grid point numbers are i, j, and k. C[i:j:k] represents the value of a grid point whose grid point numbers are i, j, and k on the three axes. N, M, and L represent the numbers of grid points on the R, G, and B axes, respectively. FIG. 1 is a schematic view of three-dimensionally arranging grid points for easy visual understanding, but the LUT must be converted into a one-dimensional table when a digital processing apparatus processes the LUT. There are several methods of expressing an LUT by a one-dimensional table C[x]. In the embodiments, a three-dimensional LUT is converted into a one-dimensional table according to a rule as shown in FIG. 3 so as to easily represent the neighboring relationship between grid points in the three-dimensional space when arranging grid points in the LUT three-dimensionally as shown in FIG. 1. According to this rule, the value C[i:j:k] of a grid point in a three-dimensional LUT is converted into C[i*M*L+j*L+k] in a one-dimensional LUT. For example, FIG. 3 shows the relationship between the one-dimensional table C[x] and the three-dimensional table C[i:j:k] for N=5, M=3, and L=7. The difference between C[x] and C[i:j:k] is not essential, and is merely a difference in the representation of LUT elements. The suffix of the LUT takes a one-dimensional value in the embodiments, but even when the suffix is expressed by a three-dimensional value, the same processing is applicable. In FIG. 3, an element specified by the index x=i*M*L+j*L+k is accessed in the conversion table C[x].

Figure 4:
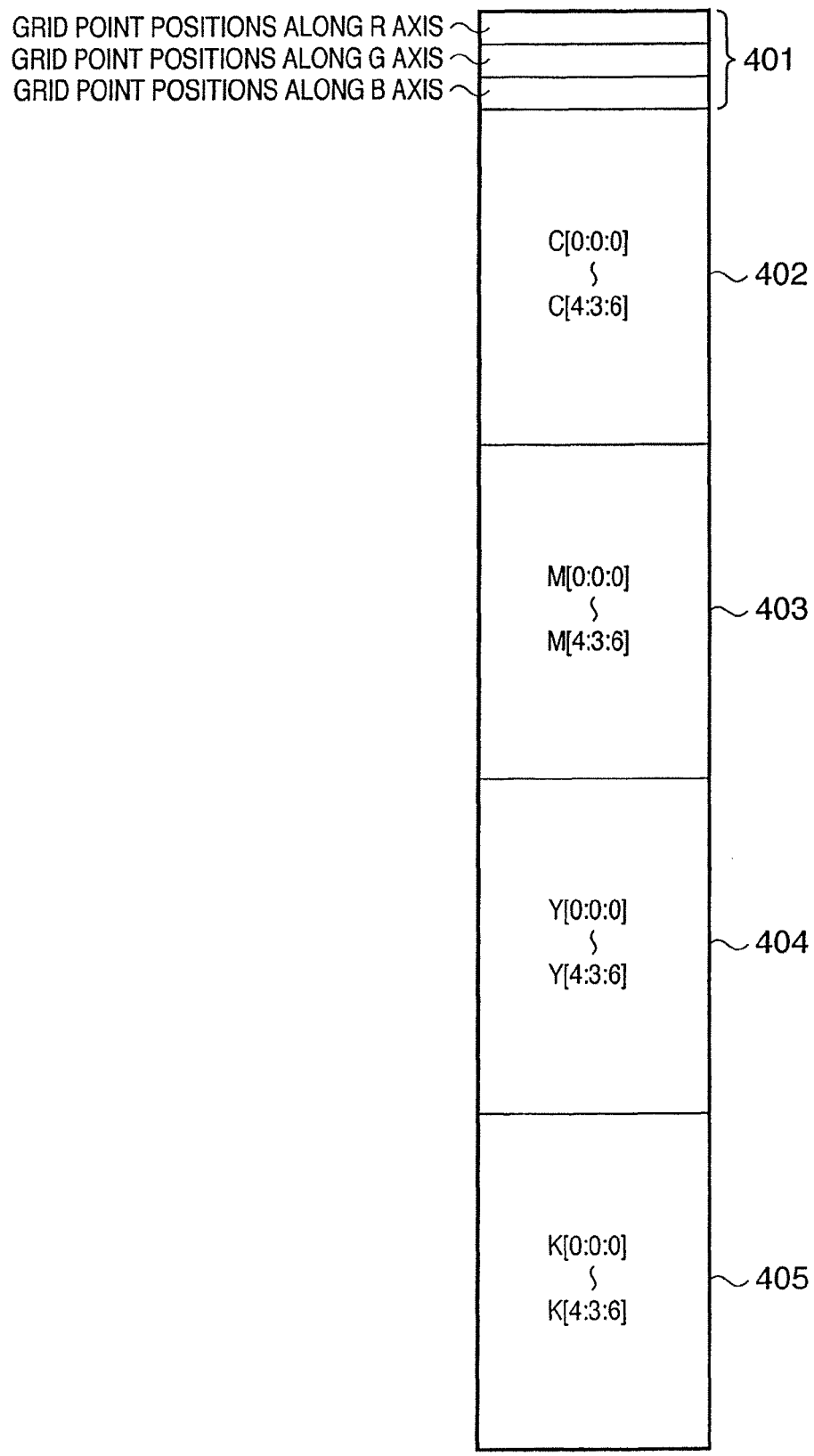
FIG. 4 is a view of exploding a triaxial LUT, which stores a plurality of output data, into a one-dimensional table.

An LUT in which one grid point holds a plurality of grid point values manages each grid point value as shown in FIG. 4. More specifically, one data is prepared by concatenating the one-dimensional table of the second element after that of the first element and concatenating the one-dimensional table of the third element after that of the second element. The concatenated data is compressed as a whole. In FIG. 4, grid point positions 401 on the respective axes of the input coordinate system are described. Then, a conversion table 402 of the cyan element is described in the order shown in FIG. 3, and magenta, yellow, and black output elements 403 to 405 are similarly described. At the grid point positions 401, input values corresponding to grid points are described preferably in the ascending or descending order so as to discriminate the input values for each grid point. For example, when grid points are given by 0, 128, and 255, these values are discriminatively described. The positions of grid points are described for each axis. In the example of FIG. 4, the positions of grid points are common to all output elements. If the positions of grid points are not common to all output elements, R, G, and B grid point positions are prepared for a conversion table of each color component.

In the following description, an LUT (total number of grid points is 105) will be exemplified in which the numbers of grid points shown in FIG. 3 are 5, 3, and 7 on the R, G, and B axes. The present invention is also applicable to any LUT having two or more grid points.

Figure 34:
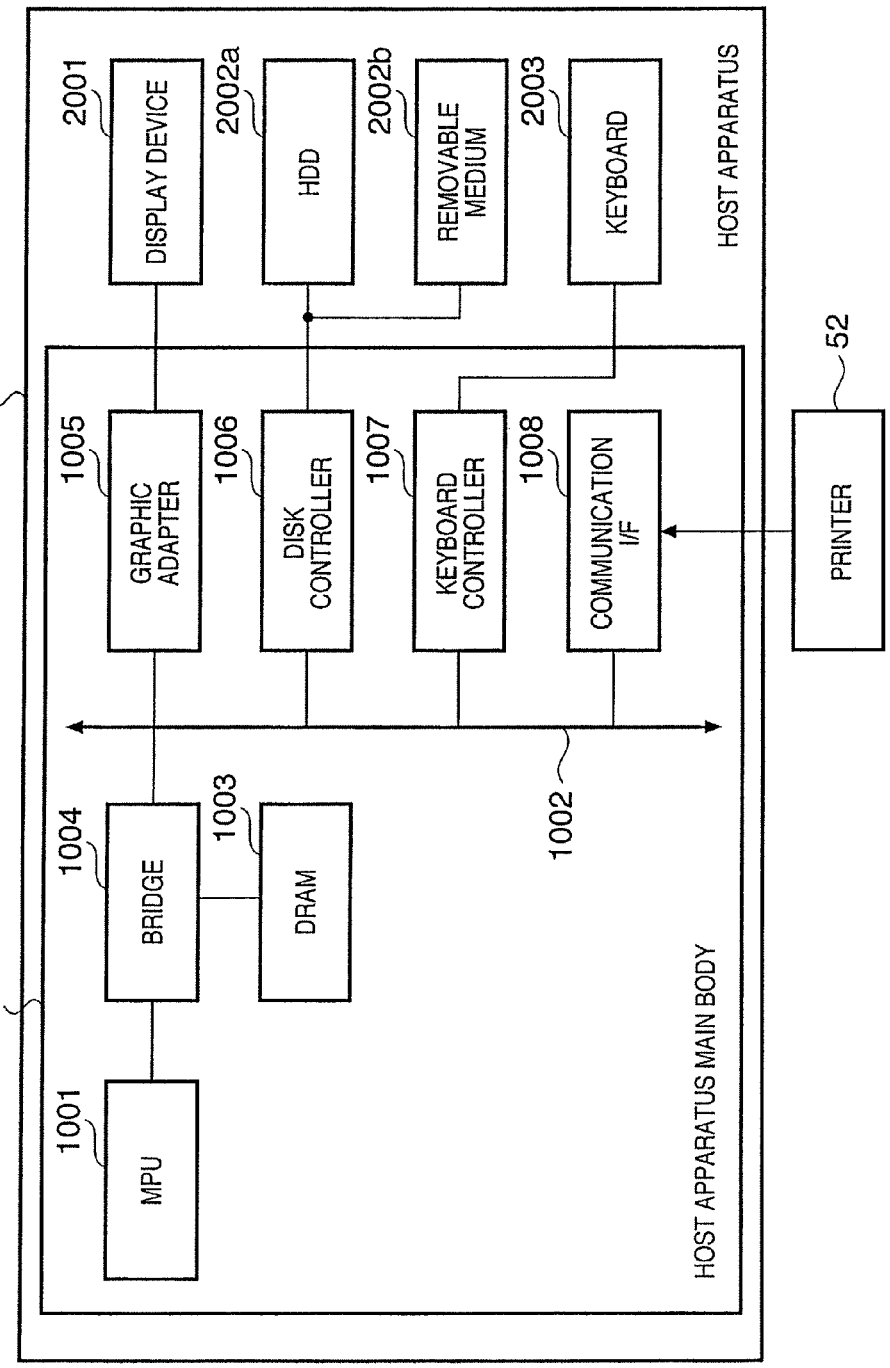
FIG. 34 is a block diagram of a computer.

Before a description of each embodiment, the arrangement of a computer which executes a program complying with a flowchart to be described in the embodiment will be explained. The computer is a general-purpose one. The hardware configurations of a host apparatus 51 and image output apparatus 52 will be described with reference to FIG. 34. FIG. 34 is a block diagram showing the schematic hardware configurations of the host apparatus (computer) 51 and image output apparatus (printer) 52 which form an information processing system. As shown in FIG. 34, the host apparatus 51 comprises a processing unit 1000 and peripheral device. The printer 52 comprises an engine unit and control circuit unit.

The processing unit 1000 of the host apparatus 51 comprises an MPU 1001 which controls the whole host apparatus in accordance with a control program, a bus 1002 which connects system building elements to each other, and a DRAM 1003 which temporarily stores programs, data, and the like executed by the MPU 1001. The processing unit 1000 comprises a system bus, a memory bus, a bridge 1004 which connects the MPU 1001, and a graphic adapter 1005 having a control function of displaying graphic information on a display device 2001 such as a CRT. The processing unit 1000 also comprises a disk controller 1006 which controls the interface with an HDD device 2002a and removable disk 2002b. The processing unit 1000 further comprises a keyboard controller 1007 which controls the interface with a keyboard 2003, and a communication I/F 1008 which controls communication with the image output apparatus 52 in accordance with the IEEE1284 or USB standard. The display device 2001 (CRT in this example) which displays graphic information or the like to the operator via the graphic adapter 1005 connects to the processing unit 1000. The keyboard 2003, and the hard disk drive (HDD) device 2002a serving as a large-capacity storage device which stores programs and data connect to the processing unit 1000 via the corresponding controllers.

A compressed color conversion table to be described in each embodiment is downloaded from a server via a network (not shown) or provided as electromagnetic data by the removable disk 2002b. The HDD 2002a saves the provided color conversion table. The computer 51 executes a printer driver which, for example, converts image data to be transmitted to the printer 52. The printer driver looks up the color conversion table stored in the HDD 2002a, and converts a color defined in the RGB color space into one defined in the YMCK color space. The HDD 2002a saves a plurality of compressed color conversion tables in correspondence with various print settings. The printer driver provides a user interface which allows a user to make print settings such as the paper type. The printer driver selects a color conversion table corresponding to designated print settings from a plurality of compressed color conversion tables, and decodes the selected color conversion table (in this example, decoding or decompression is used as a term opposite to compression). The printer driver uses the decoded color conversion table for color conversion.

[First Embodiment]

<Color Conversion Table Compression Processing>

Figure 5A:
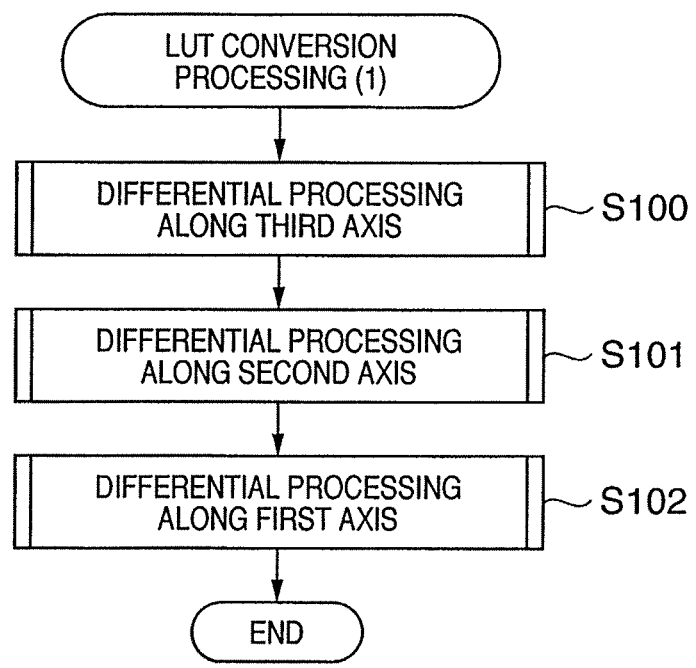
FIG. 5A is a main flowchart of the first embodiment.
Figure 5B:
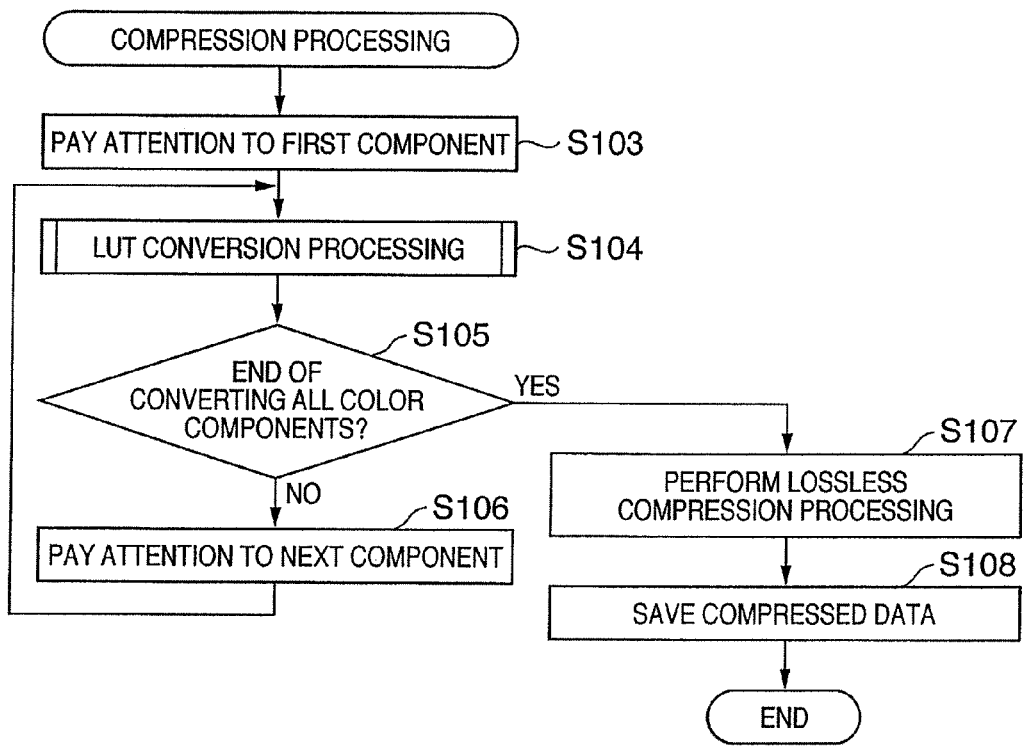
FIG. 5B is a main flowchart of LUT compression procedures.

FIG. 5B is a flowchart of compressing a color conversion table in FIG. 1. In this example, the computer of a vendor which provides a color conversion table executes the procedures in FIG. 5B. Attention is paid to the first output color component of the color conversion table (S103), and LUT conversion processing is performed for the color component of interest (S104). Since output colors are Y, M, C, and K in this example, attention is paid to C, and the C color component is converted on the basis of the color conversion table. It is tested whether conversion into all color components ends (S105). If NO in S105, attention is paid to the next color component (S106) to perform LUT conversion. If LUT conversion into all color components ends, lossless compression processing is executed for the entire color conversion table (S107), and the compressed data is saved on a recording medium (S108). When distributing the compressed color conversion table online via the network, the recording medium is an HDD 2002a. When distributing the compressed color conversion table offline via the storage medium, the recording medium is a removal medium. It is also possible to copy the compressed color conversion table from the HDD 2002a to the removable medium.

<Color Conversion Table Pre-Conversion Processing>

Figure 6:
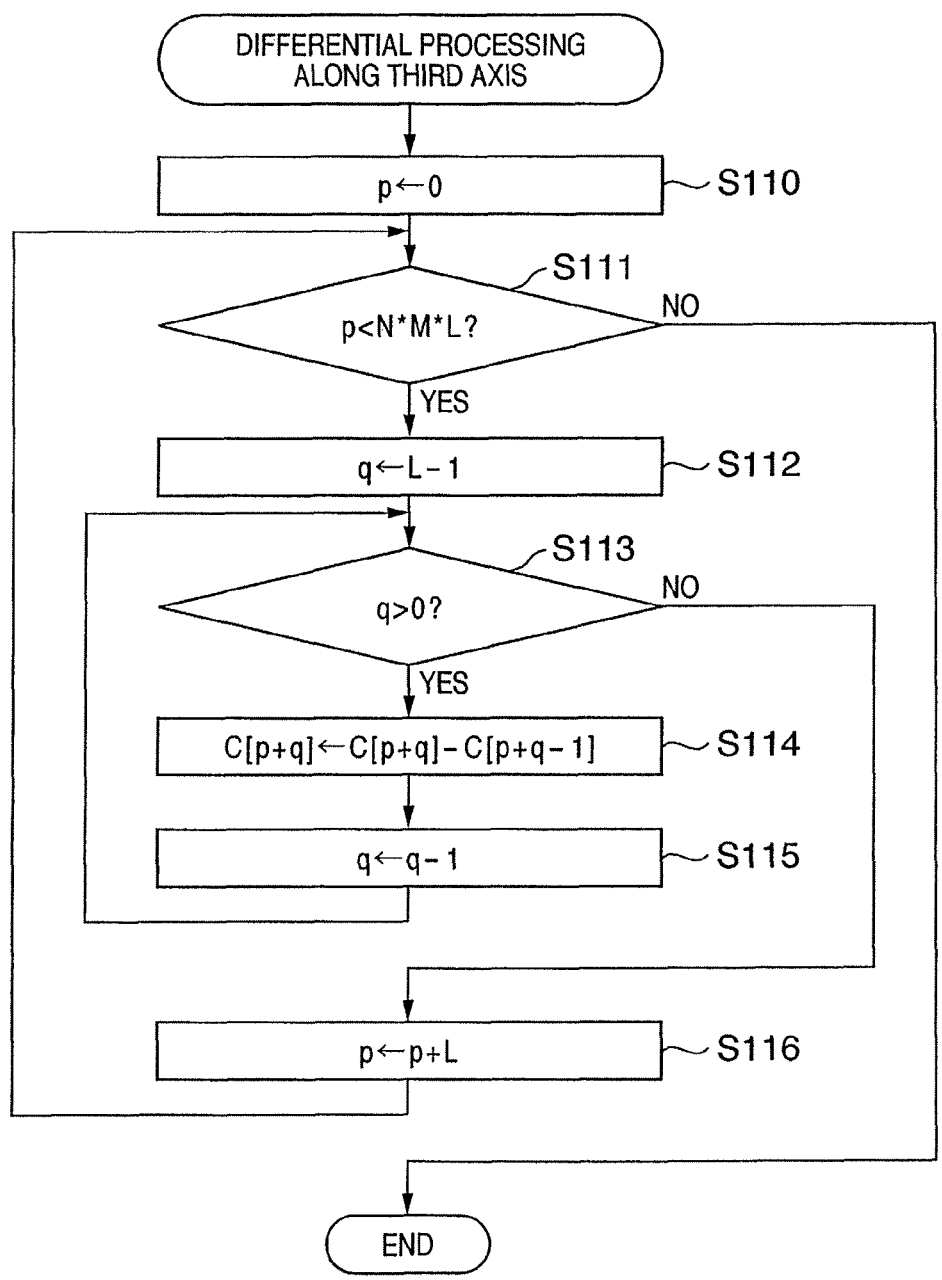
FIG. 6 is a flowchart of partial processing of conversion processing in the first embodiment.

FIG. 5A is a main flowchart showing the procedures of LUT conversion processing according to the first embodiment of the present invention. LOT conversion processing is executed in step S104 of FIG. 5B prior to compression. Processing to the LUT in the first embodiment is divided into roughly three steps S100, S101, and S102. In the respective steps, axial differences for the R, G, and B axes are calculated. The flowchart in FIG. 6 shows detailed processing procedures in step S100. In FIG. 6, the color conversion table in FIG. 4 is processed. The table of each color component is accessed with a one-dimensional index as shown in FIG. 3.

In step S100 of FIG. 5A, the difference between the value of a given grid point X and that of an adjacent grid point whose grid point number is smaller by one than the grid point X along the third axis is calculated. The difference is substituted as the value of the grid point X. This processing is executed for all grid points. Axes in a three-dimensional input color space are called the first, second, and third axes. The B component in the RGB color space corresponds to the third axis.

In steps S110 to S116 of FIG. 6, all grid point values along the third axis except for a grid point value of grid point number 0 are used as difference values from preceding grid point values. It should be noted that a difference value is overwritten in an area where an original grid point value is stored. A difference value can also be stored in another area without overwrite, but this processing requires the storage area of a target LOT and the same capacity of storage area for storing difference values. Processing can proceed backward (in descending order of the grid point number) while overwriting a difference value.

In FIG. 6, N, M, and L are constants determined by the number of grid points in the color conversion table. The numbers of grid points of the R, G, and B color components in FIG. 4 are substituted into N, M, and L. C[x] is a color conversion table of a format expressed by a one-dimensional index as shown in FIG. 3, and FIG. 6 (also FIGS. 7 and 8) exemplifies the cyan component. p and q are variables which are allocated in a DRAM 1003.

The variable p represents a grid point position along the second axis (i.e., G). According to $x=i*M*L+j*L+k=(i*M+j)*L+k$ which one-dimensionally gives the grid point position (index) x, $p=(i*M\ j)*L$. M and L are constants, and p increases in units of L. Thus, the grid point position along the first axis and the grid point position j along the second axis are determined by giving p. The variable q corresponds to k, and determines a grid point position along the third axis. In steps S113 to S115, the value q for the third axis is set to a maximum value of L−1 at grid point positions on the first and second axes that are determined by the variable p. Using the grid point as a grid point of interest, the value of a grid point adjacent to the grid point of interest on the third axis is subtracted from the value of the grid point of interest, and the difference value is overwritten as the value of the grid point of interest. In this case, an adjacent grid point has a grid point number smaller than that of the grid point of interest. This processing is repeated while decrementing the grid point position of interest by one on the third axis. Since a grid point at a position of k=q=0 does not have any adjacent grid point subjected to subtraction, subtraction is done for only q>0. In step S116, the grid point position subjected to subtraction shifts by one along the second axis.

This processing corresponds to calculation of the difference between grid point values adjacent to each other along the B axis when the LUT is a rectangular parallelepiped in which grid points are three-dimensionally arranged as shown in FIG. 1. By differential processing, the grid point value exhibits a change amount along the B axis.

Processing to calculate a difference in the first embodiment will be explained. In general, the difference d between two values a and b is calculated by d=a−b into a value with a positive sign for a≥b or a negative sign for a<b. In this calculation, even when a and b take 8-bit values of 0 to 255, the difference d takes a value of −255 to 255. To record a signed correct difference, 9 bits including the sign bit are necessary. However, the difference in the present invention need not be a correct one between two values, and suffices to achieve restoring. Thus, the difference d is represented as a value within an 8-bit range of 0 to 255 by executing differential processing as the following processing described in the C language which is a programming language:

```
d = a − b;
if (d < 0) {
    d = d + 256;
}.
```

Merge processing to restore the value a from the difference d and value b is as follows:

```
a = b + d;
if (a ≥ 256) {
    a = a − 256;
}.
```

These calculations are done at digit positions the number of which are larger than 8 bits. If the number of digit positions in calculation is limited to 8 bits, differential processing and merge processing can be done using unsigned subtraction and unsigned addition without any conditional processing.

Several calculation examples of differential/merge processing will be described. A parenthesized value is a grid point value of interest converted in differential calculation, and a grid point value of interest restored in merge calculation.

| | |
|---|---:|
| (82)−57=25, | Differential calculation 1 |
| 57+25=(82), | Merge Calculation 1 |
| (228)−3=225, | Differential Calculation 2 |
| 225+3=(228), | Merge Calculation 2 |
| (57)−82=<25, −25+256=231, | Differential Calculation 3 |
| 82+231=313, 313−256=(57), | Merge Calculation 3 |
| (0)−255=−255, −255+256=1, | Differential Calculation 4 |
| 255+1=256, 256−256=(0), | Merge Calculation 4 |
| (23)−254=−231, −231+256=25, and | Differential Calculation 5 |
| 254+25=279, 279−256=(23). | Merge Calculation 5 |

Differential processing and merge processing are generalized as follows so as to be applicable to an arbitrary bit count p.

Difference:

```
d = a − b;
if (d < 0) {
    d = d + 2^P;
}.
```

Merge:

```
a = b + d;
if (a ≥ 2^P) {
    a = a − 2^P;
}.
```

The use of unsigned calculation with the number p of digit positions can omit these conditional processes (processes after "if").

When the grid point value may take a signed negative value, differential processing is applicable by regarding a signed grid point value as a positive value including the sign bit. Merge is also applicable by regarding a value obtained by merge processing as a signed value without changing the processing itself.

Processing from step S110 to step S116 can be given by C[i:j:k]←C[i:j:k]−C[i:j:k−1], i=0 to N−1, j=0 to M−1, and k=L−1 to 1.

Figure 9:
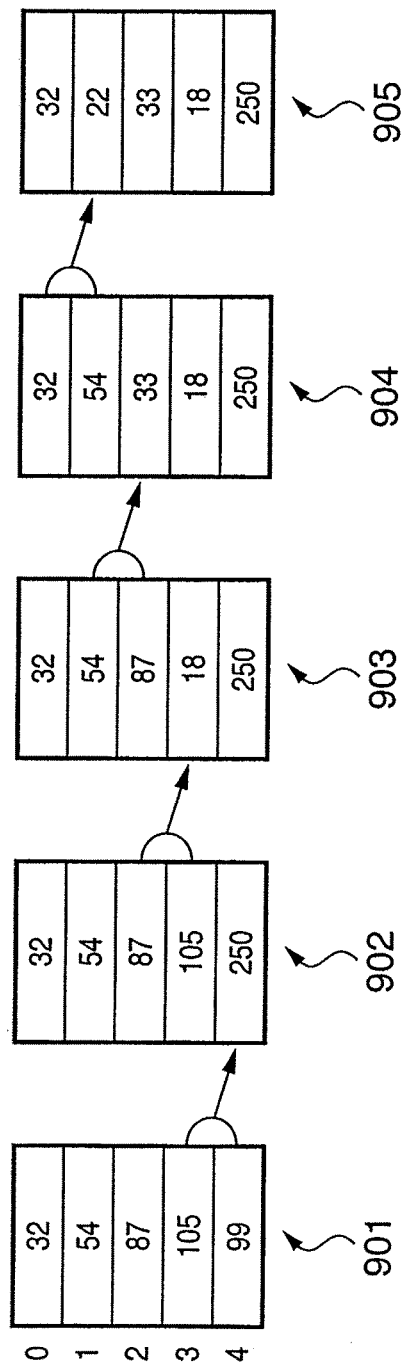
FIG. 9 is a view showing change of the grid point value by differential processing.

FIG. 9 shows change of values when five values undergo backward differential processing. Although the procedures in FIG. 6 sequentially rewrite one conversion table, FIG. 9 separately shows tables before and after update for descriptive convenience. The table in FIG. 9 is obtained by arranging grid point values along the third axis (k) in the order of grid point positions with constant indices i and j in the table C[i:j:k]. A leftmost table 901 is an initial table. As the table proceeds to a right one, the grid point value is updated to a difference from one preceding grid point value sequentially from the bottom grid point value. In a table 905 after the end of processing, all grid point values except for the top grid point value are updated to difference values from preceding grid point values. To the contrary, an upper value is added (merged) to a lower value sequentially from the right in FIG. 9, returning grid point values to the initial state in the leftmost table.

Figure 7:
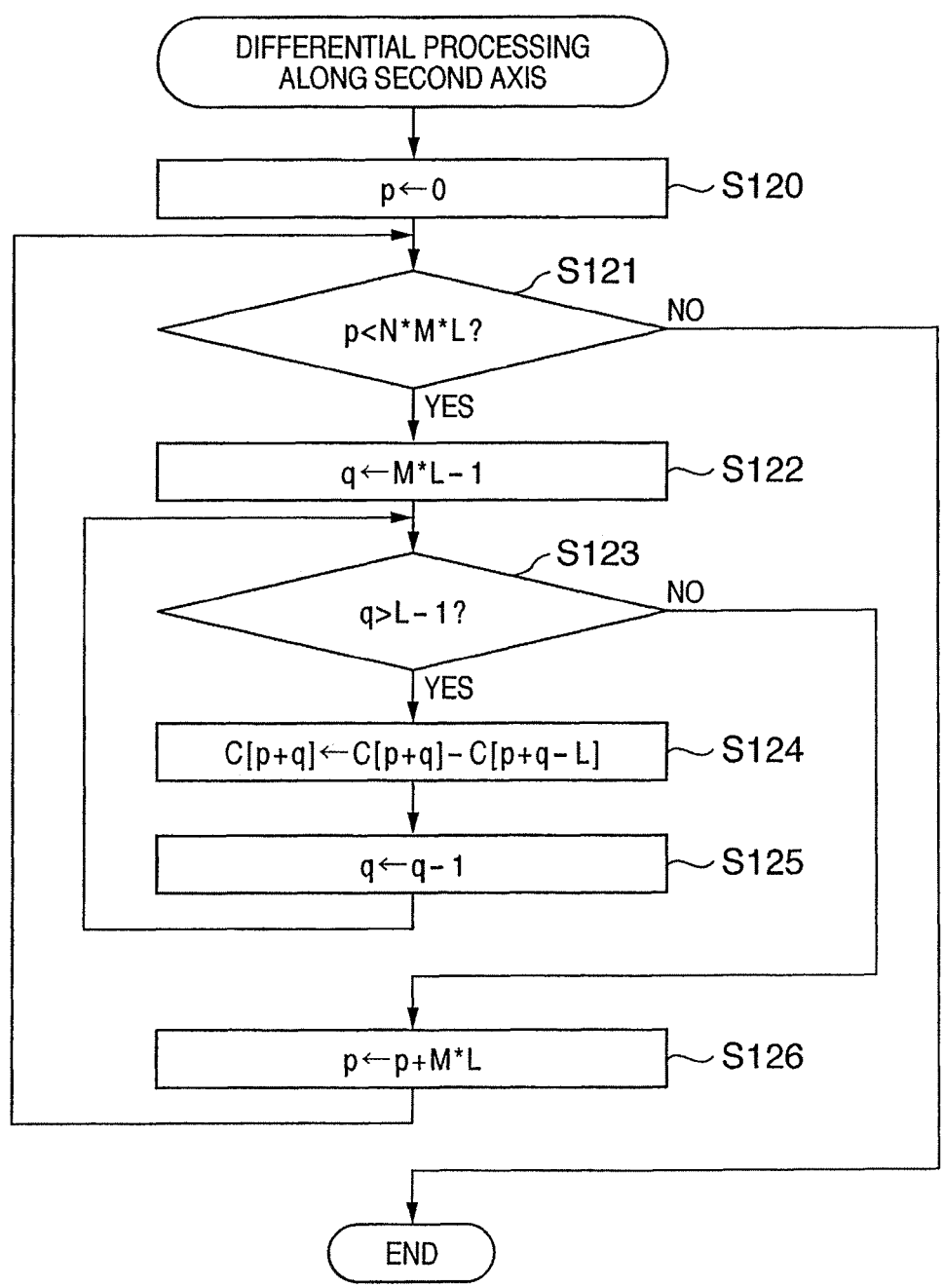
FIG. 7 is a flowchart of partial processing of conversion processing in the first embodiment.

The flowchart in FIG. 7 shows detailed processing procedures in step S101. In steps S120 to S126 of FIG. 7, all grid point values along the second axis except for a grid point value of grid point number 0 are updated to difference values from grid point values preceding by the number L of grid points.

Similar to steps S110 to S116, processing proceeds backward while overwriting a difference value. This processing corresponds to calculation of the difference between grid point values adjacent to each other along the G axis (second axis) when the LUT is a rectangular parallelepiped in which grid points are three-dimensionally arranged as shown in FIG. 1. In FIG. 7, the N, M, and L values are equal to those in FIG. 6. The variable p represents an index along the R axis (first axis). The variable q represents a grid point position on the BG plane given by the variable p. The initial value of q is M*L−1, that is, represents grid points of the maximum value on both the G and B axes. The difference is calculated while moving the grid point of interest one by one from this position along the B axis.

Processing from step S120 to step S126 can be given by C[i:j:k]←C[i:j:k]−C[i:j−1:k], i=0 to N−1, j=M−1 to 1, and k=0 to L−1.

Assuming processing in FIG. 6, C[i:j:k]=C[i:j:k]−C[i:j:k−1], and C[i:j−1:k]=C[i:j−1:k]−C[i:j−1:k−1]. Therefore, C[i:j:k]←(C[i:j:k]−C[i:j:k−1]) (C[i:j−1:k]−C[i:j−1:k−1]).

Figure 8:
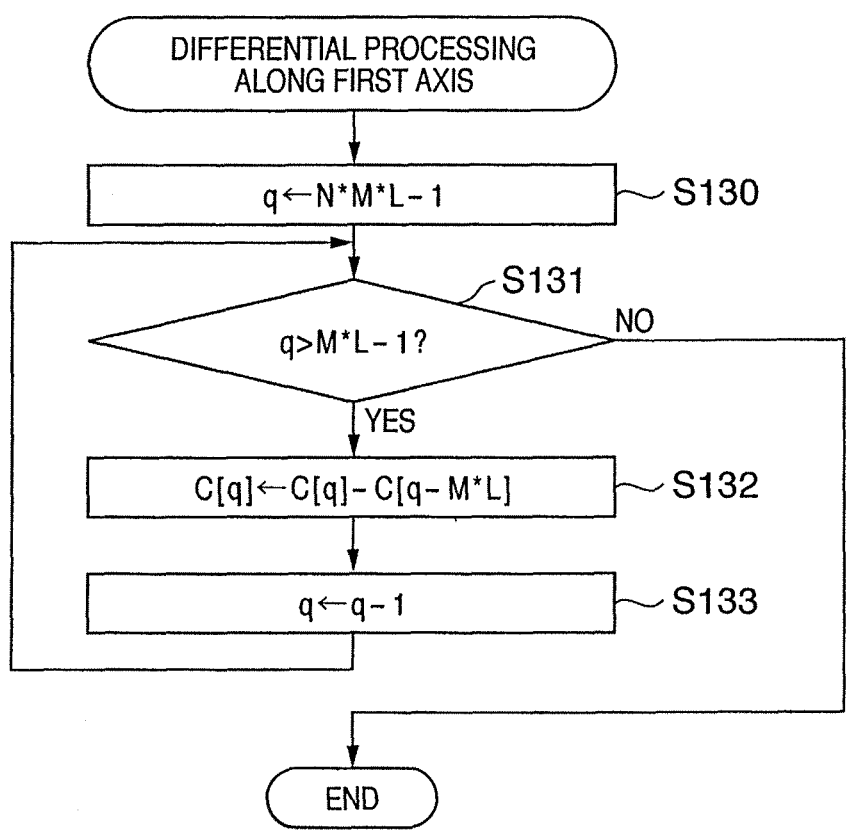
FIG. 8 is a flowchart of partial processing of conversion processing in the first embodiment.

The flowchart in FIG. 8 shows detailed processing procedures in step S102. In steps S130 to S133, all grid point values along the first axis except for a grid point value of grid point number 0 are updated to difference values from grid point values preceding by the number M*L of grid points. This processing corresponds to calculation of the difference between grid point values adjacent to each other along the R axis when the LUT is a rectangular parallelepiped in which grid points are three-dimensionally arranged as shown in FIG. 1. In FIG. 8, the M, N, and L values are equal to those in FIG. 6. The variable q represents a one-dimensional index in the color conversion table. The initial value of q is NML−1, i.e., a value at the bottom of the table in FIG. 3. The difference from a grid point adjacent along the first axis is calculated while moving the grid point of interest one by one from this position.

Processing from step S130 to step S133 can be given by C[i:j:k]←C[i:j:k]−C[i−1:j:k], i=N−1 to 1, j=0 to M−1, and k=0 to L−1.

Assuming the processes in FIGS. 6 and 7, the axial difference value C' for all the axes in the table C is given by $$C'[i:j:k] \leftarrow ((C[i:j:k]-C[i:j:k-1])-(C[i:j-1:k]-C[i:j-1:k-1]))-((C[i-1:j:k]-C[i-1:j:k-1])-(C[i-1:j-1:k]-C[i-1:j-1:k]))=C[i:j:k]-C[i:j:k-1]-C[i:j-1:k]-C[i-1:j:k]+C[i:j-1:k-1]+C[i-1:j:k-1]+C[i-1:j-1:k]-C[i-1:j-1:k-1] \quad (1)$$

The above processing updates all grid point values except for [0:0:0] to difference values. In equation 1, the value of a term having no corresponding grid point is 0. As a result, all grid points including grid points at the end of a matrix such as coordinates [0:0:0] can be represented by equation 1 (including the provision). In the first embodiment, a value represented by equation 1 is called a difference value for all the axes. Calculation of a difference value regarding the grid point [i:j:k] of interest is not limited to equation 1. In the above example, no difference is calculated for the value of a grid point [0:0:0]. This is because difference values along the respective axes can be calculated independently. It is selectable for each axis whether to subtract a grid point adjacent in the negative direction from a grid point of interest (like the above example), or to subtract a grid point adjacent in the positive direction from a grid point of interest. A grid point such as a grid point [0:0:0] whose value (the second term in differential calculation) is only subtracted is called the origin of the difference. Any of eight corners of the matrix is selectable as the origin of the difference. Even an equation obtained by replacing "i−1", "j−1", and "k−1" in equation 1 with "i+1", "j+1", and "k+1" also represents an axial difference for all the axes. This also applies to a case of replacing not all but some of "i−1", "j−1", and "k−1". The definition of the axial difference C'[i:j:k] for all the axes is generalized into $$C'[i:j:k]=C[i:j:k]-C[i:j:k-a3]-C[i:j-a2:k]-C[i-a1:j:k]+C[i:j-a2:k-a3]+C[i-a1:j:k-a3]+C[i-a1:j-a2:k]-C[i-a1:j-a2:k-a3] \quad (1')$$

where a1, a2, and a3 are −1 or 1, and the value of a term having no corresponding grid point is 0. A value of a grid point is referred to as a grid point value in this specification.

In the above description, a grid point value for which no difference is calculated for each axis is defined as the 0th grid point value. Instead, not the 0th but final grid point value along each axis can also be set as a grid point value for which no difference is calculated. For example, when no difference of the final grid point value along the third axis is calculated, the loop from step S110 to S116 is repeated forward from 0 within a range of 0 to L−2. This corresponds to procedures to calculate an axial, difference for all the axes at parameters a1=−1, a2=1, and a3=1 in equation 1' in order to reverse the loop for the third axis.

The above-described first embodiment executes differential processing along the third axis, then along the second axis, and finally along the first axis. However, the processing is also executable by arbitrarily changing this order. The same result can be obtained at the end of differential processing along all the three axes. This is apparent from equation 1. That is, it is apparent that differential processes along the respective axes are independent of each other and the same result can be attained even upon changing the order of the differential processes.

The data amount of the conversion table does not change even after executing the above-described processing. This processing is to convert values stored in the conversion table so as to effectively compress them, and is not compression processing to reduce the data amount. However, by calculating the differences of grid point values along the three axes, grid point values distributed without any deviation concentrate at values near 0 or 255. The value of a given grid point in a color conversion LUT only slightly changes from that of a grid point adjacent to the given grid point. That is, successive grid point values change smoothly in most cases. Thus, calculating differences for the three axes reduces grid point values. As is apparent from the description of differential processing and merge processing, a value "255" corresponds to −1. A value near 0 is a numerical value in which a short string of "1"s appears after a relatively long reading of "0"s in binary expression.

A value near 255 is a numerical value in which "0"s appear after a relatively long reading of "1"s in binary expression. For example, by using the run length, such a value can be losslessly compressed at high compression ratio. The grid point position 401 along each axis is part of data which forms a conversion table. The grid point position 401 is not subjected to differential processing for all the axes, but is provided as part of a compressed LUT or together with the compressed LUT to a computer which utilizes the LUT.

The above-described differential processing for all the three axes is done for all output data. In step S107 of FIG. 5B, data obtained by concatenating these output data as shown in FIG. 4 is compressed. As compression processing, any method is applicable as far as the method is lossless compression capable of completely restoring original data. Examples of lossless compression are run length compression, and LZW compression disclosed in U.S. Pat. No. 4,558,302.

<Restore Processing>

FIG. 35B shows processing procedures to perform conversion processing using compressed data after performing differential processing along the three axes. A printer driver which uses a color conversion table of interest corresponding to input print settings executes this processing for the color conversion table of interest in a computer in which the printer driver is installed. In the first embodiment, the restore program in FIG. 35B is loaded into the computer together with the color conversion table compressed by the program in FIG. 5B. However, the compressed color conversion table and restore program may be separately loaded into the same computer.

First, decoding processing is performed (S3503). Because of lossless compression, data having undergone differential processing along the three axes, i.e., data immediately before step S107 in FIG. 5B can be acquired.

Then, attention is paid sequentially from the first component (i.e., first axis) (S3504). LUT restore processing is performed to restore a conversion table having undergone differential processing (S3505). This processing is repeated for each color component in the output color space (S3506 and S3507). After the end of restoring, the DRAM 1003 or HDD 2002a saves the restored color conversion table. The saved color conversion table is looked up for color conversion.

LUT restore processing complies with almost the same procedures as those of differential processing except for the following two points. First, a preceding grid point value is merged (added) with a grid point value of interest. Second, merge processing proceeds forward in order to merge a difference with a grid point value in a decoded table.

Figure 35A:
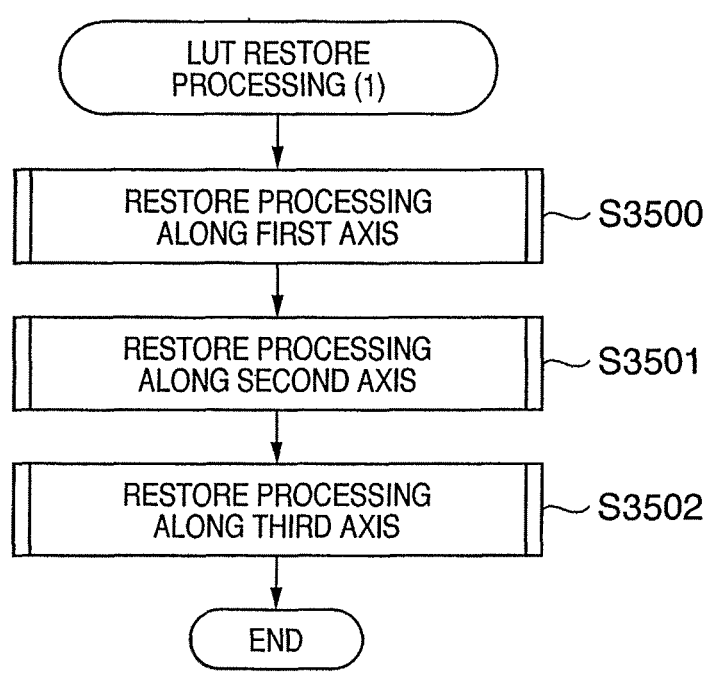
FIG. 35A is a main flowchart of LUT restore procedures in the first embodiment.
Figure 36:
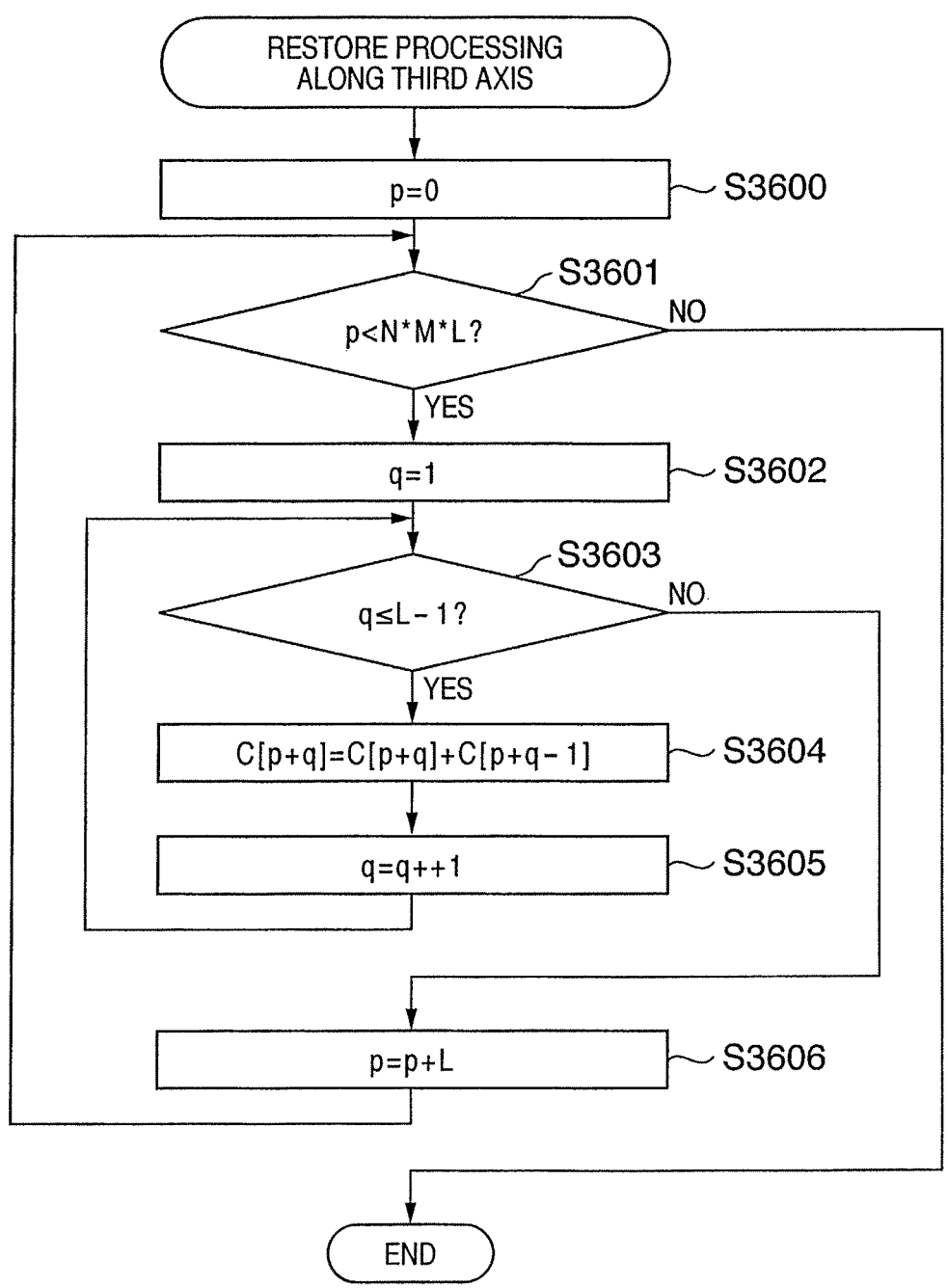
FIG. 36 is a partial flowchart of restore processing in the first embodiment.
Figure 37:
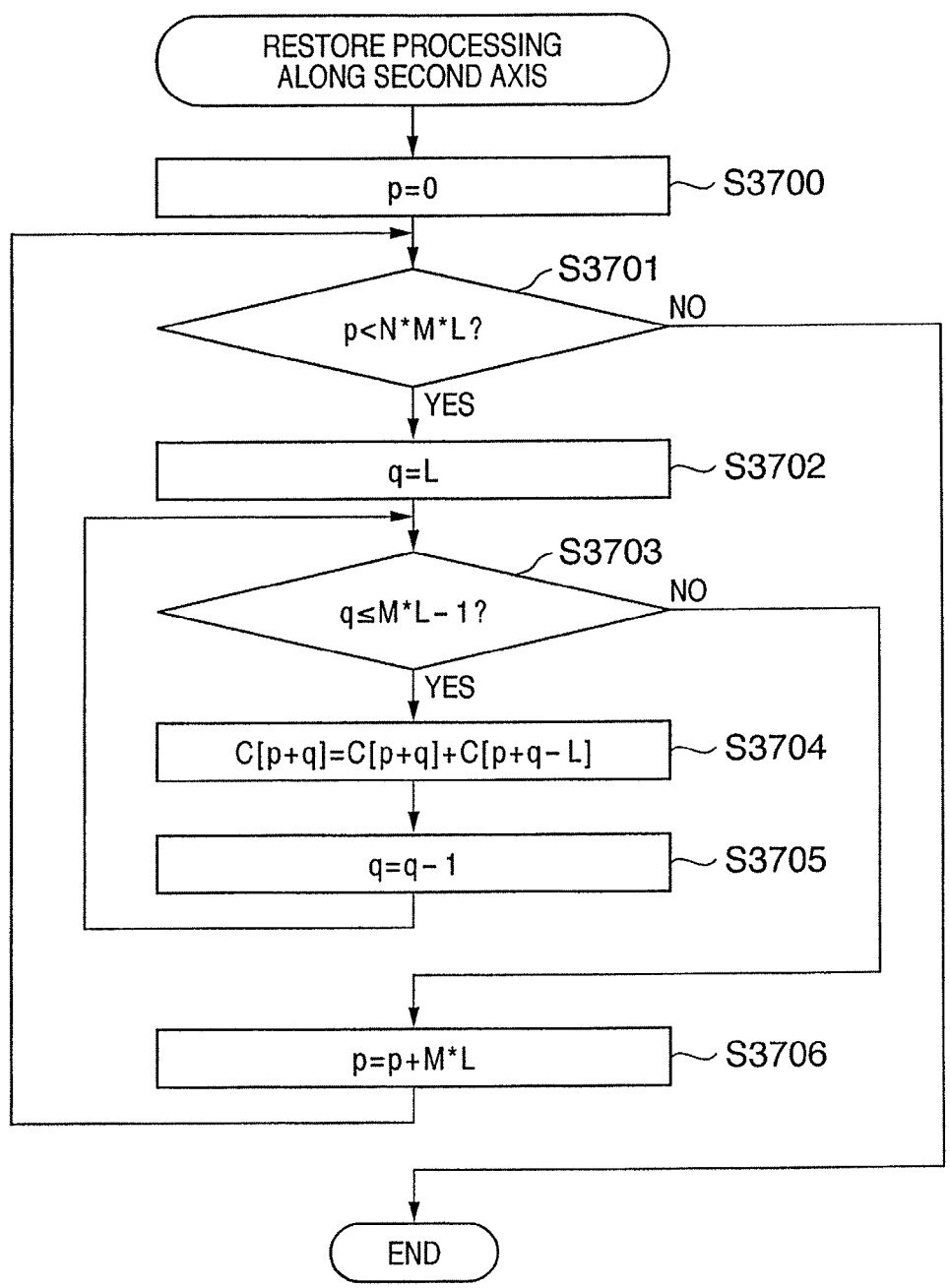
FIG. 37 is a partial flowchart of restore processing in the first embodiment.
Figure 38:
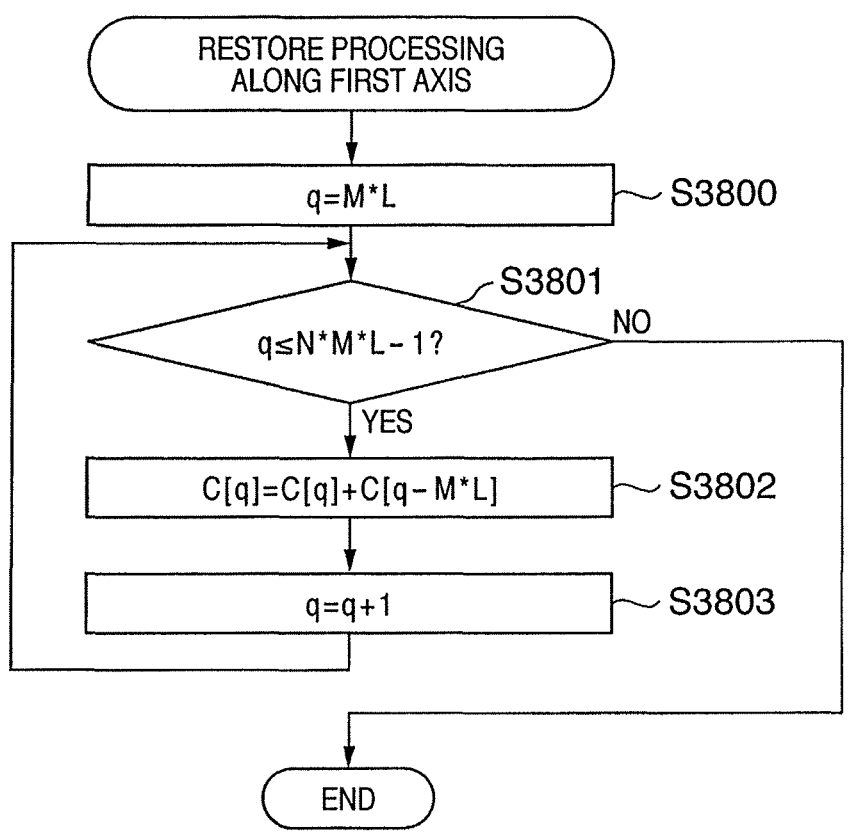
FIG. 38 is a partial flowchart of restore processing in the first embodiment.

FIG. 35A shows the procedures of LUT decompression processing. FIGS. 38, 37, and 36 show steps S3500 to S3502 in FIG. 35A, respectively. The processes in FIGS. 36, 37, and 38 almost trace back the procedures in FIGS. 6, 7, and 8. However, as long as the above-described two points are satisfied, the scan order of a table in a direction other than the axial direction of interest is arbitrary, and the order in FIGS. 36, 37, and 38 is not always opposite to that in FIGS. 6, 7, and 8. Restore processing executes the following conversion:

C[i:j:k]←C[i:j:k]+C[i:j:k−1], i=0 to N−1, j=0 to M−1, and k=1 to L−1,

C[i:j:k]←C[i:j:k]+C[i:j−1:k], i=0 to N−1, j=1 to M−1, and k=0 to L−1, and

C[i:j:k]←C[i:j:k]+C[i−1:j:k], i=1 to N−1, j=0 to M−1, and k=0 to L−1.

In the example of FIG. 35A, restoring is done in an order opposite to conversion in FIG. 5A. The order of performing differential processing and that of restoring differential processing are independent of each other. For example, even if differential processing proceeds in the order of the B axis, G axis, and R axis, restoring of differential processing can proceed in random order of, e.g., the G axis, B axis, and R axis. This is because the result does not change regardless of the restore order of differential processing, similar to the result of differential processing which does not change regardless of the order of differential processing. Accordingly, original values are restored in the color conversion table.

By the above procedures, the first embodiment can compress a color conversion table at high compression ratio using the feature of the color conversion table. Conversion and inverse conversion do not lose any information.

[Second Embodiment]

Figure 10:
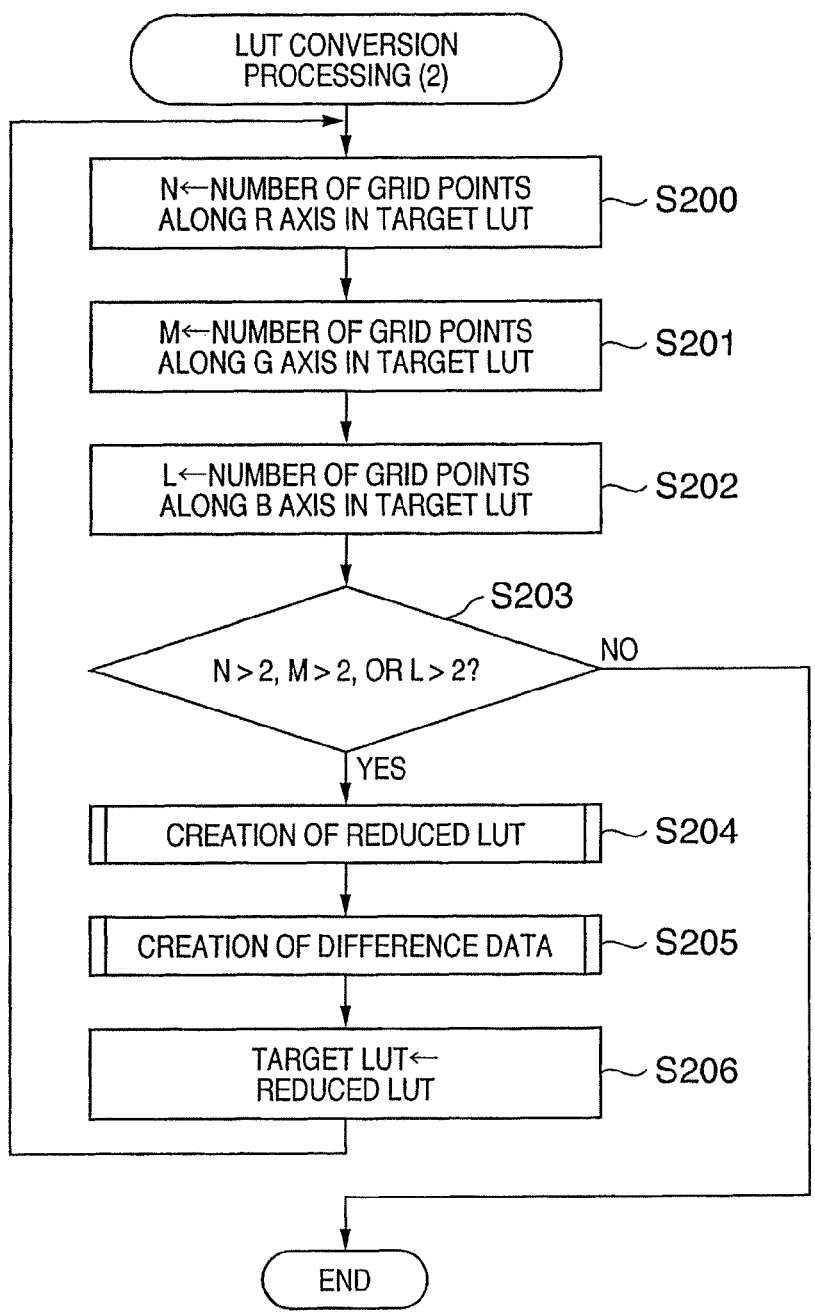
FIG. 10 a main flowchart of the second embodiment.

Similar to the first embodiment, the second embodiment is related to a method of enhancing the effects of conversion processing using the correlation between adjacent grid point values. The second embodiment converts a grid point value into a value near 0 not by calculating a simple difference between adjacent grid point values, but by calculating the difference between an actual grid point value and a value obtained by interpolation using neighboring grid point values. The second embodiment is effective especially for compression of an LUT which increases the number of grid points in order to increase the conversion precision. FIG. 10 is a main flowchart showing the procedures of LUT conversion processing according to the second embodiment of the present invention. The compression procedures are the same as those shown in FIG. 5B. Step S104 corresponds to procedures in FIG. 10. Similar to the first embodiment, the second embodiment will also exemplify a conversion table of the C component among conversion tables of the output color components (Y, M, C, and K). Conversion processing (FIG. 10) according to the second embodiment is applied to all the color components, and then compression is done.

The second embodiment is roughly formed from creation of a reduced LUT in step S204 and creation of difference data in step S205. Steps S204 and S205 are repeated while decreasing the number of grid points. In FIG. 10, N, M, and L values are set (S200 and S201). The meanings of these values are the same as those in FIGS. 6 to 8 in the first embodiment.

Figure 11:
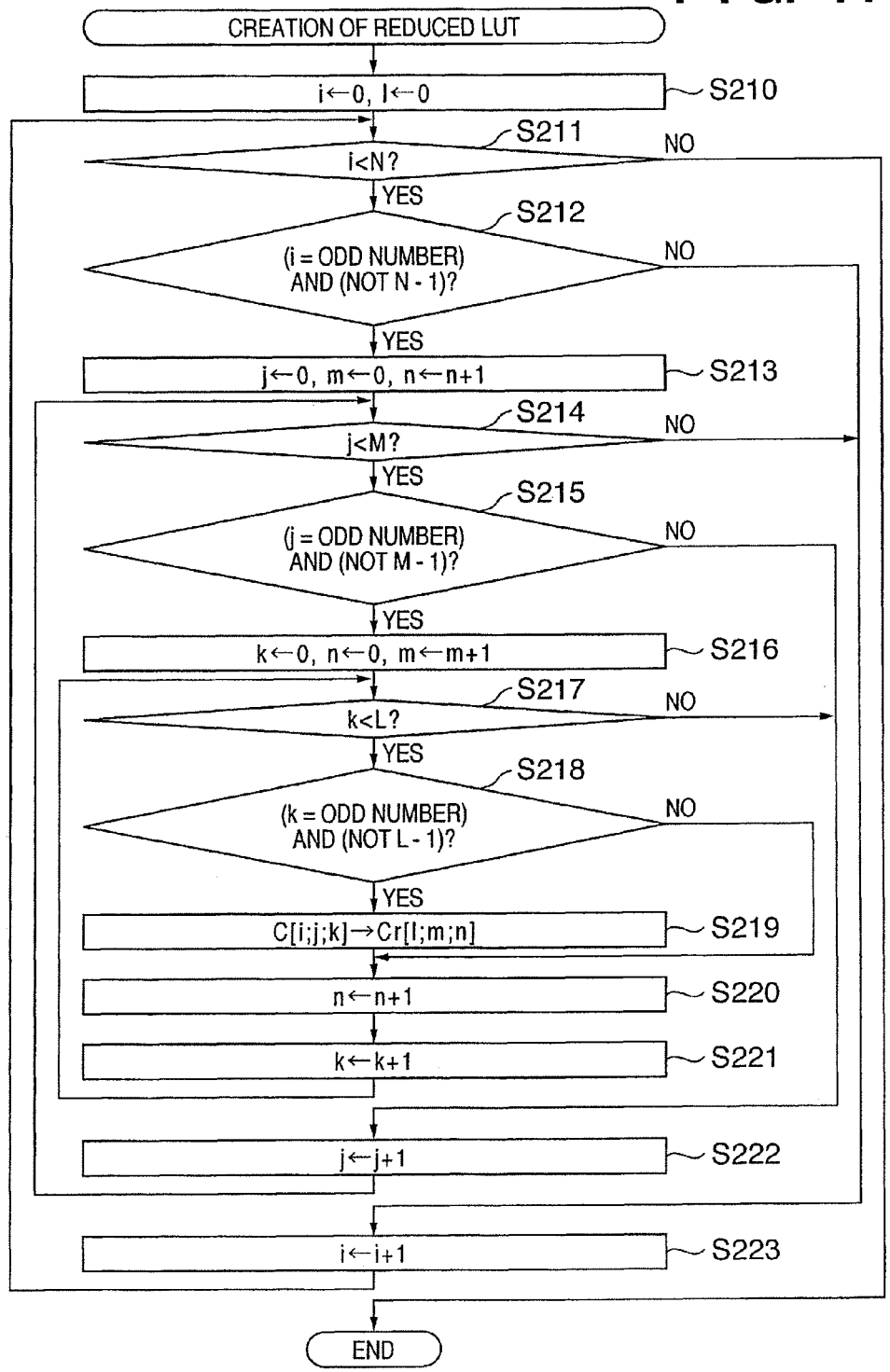
FIG. 11 is a flowchart of partial processing of conversion processing in the second embodiment.

In step S204, the reduced LUT is thinned out until it decreases to a minimum interpolatable size, i.e., the number of grid points on each coordinate axis decreases to 2. In step S205, a difference table is created by calculating, for each grid point, difference data between the interpolation value of the reduced LUT and a grid point value corresponding to the interpolation value in an LUT before thinning-out. FIG. 11 is a flowchart showing the procedures of reduced-LUT creation processing.

In FIG. 11, the values of grid points of even grid point numbers and that of the final grid point are set as the values of grid points in the reduced LUT. This processing is applied to all the first to third axes, creating a reduced LUT in which the number of grid points is almost halved. For example, a reduced LUT having nine grid points on each of all the three axes is created from an LUT having 17 grid points on each axis. The procedures in FIG. 11 are implemented by representing a conversion table by three-dimensional indices. However, even when the conversion table is represented by one-dimensional indices, similar to the first embodiment, the same thinning-out processing as that in FIG. 11 is also implementable according to the conversion equations described in the first embodiment.

In FIG. 11, the variables i, j, k, l, m, and n are allocated in a DRAM 1003. The constants N, M, and L are also saved in the DRAM. The variables i, j, and k are the indices of the first coordinate axis (R), second coordinate axis (G), and third coordinate axis (B) in the input color space of an LUT to be thinned out, and represent grid point numbers, respectively. The variables l, m, and n are the indices of the first coordinate axis (R), second coordinate axis (G), and third coordinate axis (B) of the LUT reduced by thinning-out, and represent grid point numbers, respectively. C[i:j:k] represents the grid point value of the LUT to be thinned out, and Cr[l:m:n] represents the grid point value of the reduced LUT. According to the procedures in FIG. 11, the values of grid points whose grid point numbers are odd or maximum are left for the R, G, and B axes. The values of the remaining grid points are thinned out from a target LUT, creating Cr[l:m:n] as a reduced LUT.

Figure 12:
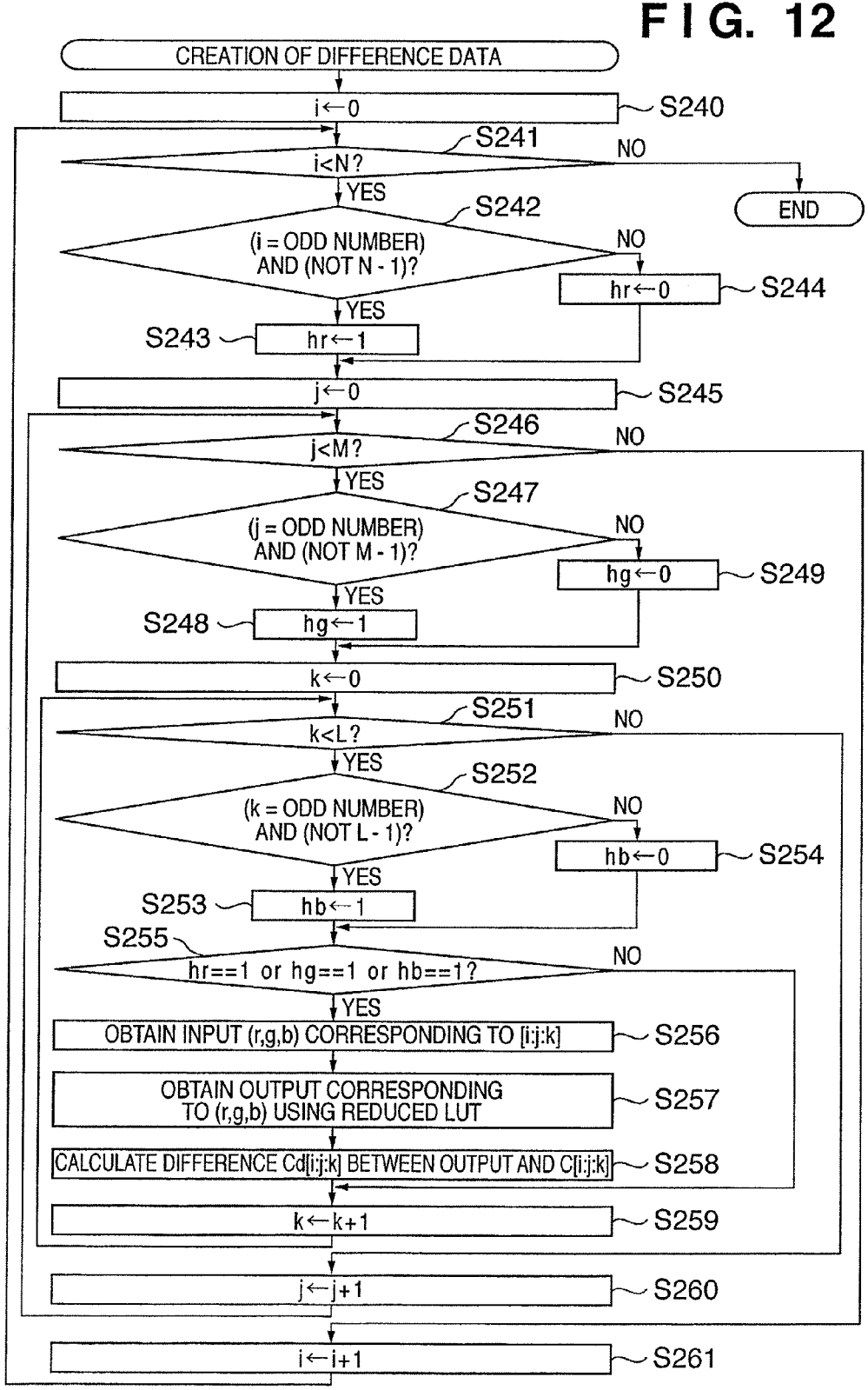
FIG. 12 is a flowchart of partial processing of conversion processing in the second embodiment.

FIG. 12 is a flowchart showing the procedures of processing to create difference data in step S205 of FIG. 10. Difference data is the difference between the value of a grid point thinned out from the grid points of an original LUT (LUT to be thinned out), and an output data value calculated by interpolation from a reduced LUT in correspondence with the grid point. The reduced LUT does not contain, among the values of grid points in the original LUT, the values of grid points which have odd grid point numbers along each axis and are not the final grid point. An output value is calculated using the position of an excluded grid point as input data of the reduced LUT. When a grid point position corresponding to input data is not registered in the LUT, an output value is generally calculated by interpolation and output. Although interpolation is possible by any known method, the same interpolation method as that used by the printer driver of the second embodiment in actual color conversion processing is adopted most preferably. The difference between the value of a grid point thinned out from the original LUT and an output value calculated by interpolation on the basis of the reduced LUT is calculated. The calculated difference value is stored in the difference table. The difference table has the same dimension as that of the original LUT. The difference value between the value of a thinned-out grid point and an interpolation value is registered at the same grid point as the thinned-out grid point. The difference is calculated by the same method as that described in the first embodiment. An example of interpolation calculation is linear interpolation.

In FIG. 12, the variables and constants have almost the same meanings as those in FIG. 11. Variables unique to FIG. 12 are flags hr, hg, and hb. When all these flags are 0, this represents that a grid point of interest (whose grid point number is represented by the variables i, j, and k) is not thinned out. (r,g,b) represents a luminance value. Cd[i:j:k] represents difference data associated with a grid point of interest. According to the procedures in FIG. 12, difference data corresponding to a thinned-out grid point is obtained and registered at a corresponding position in the difference table, as described above.

Figure 13:
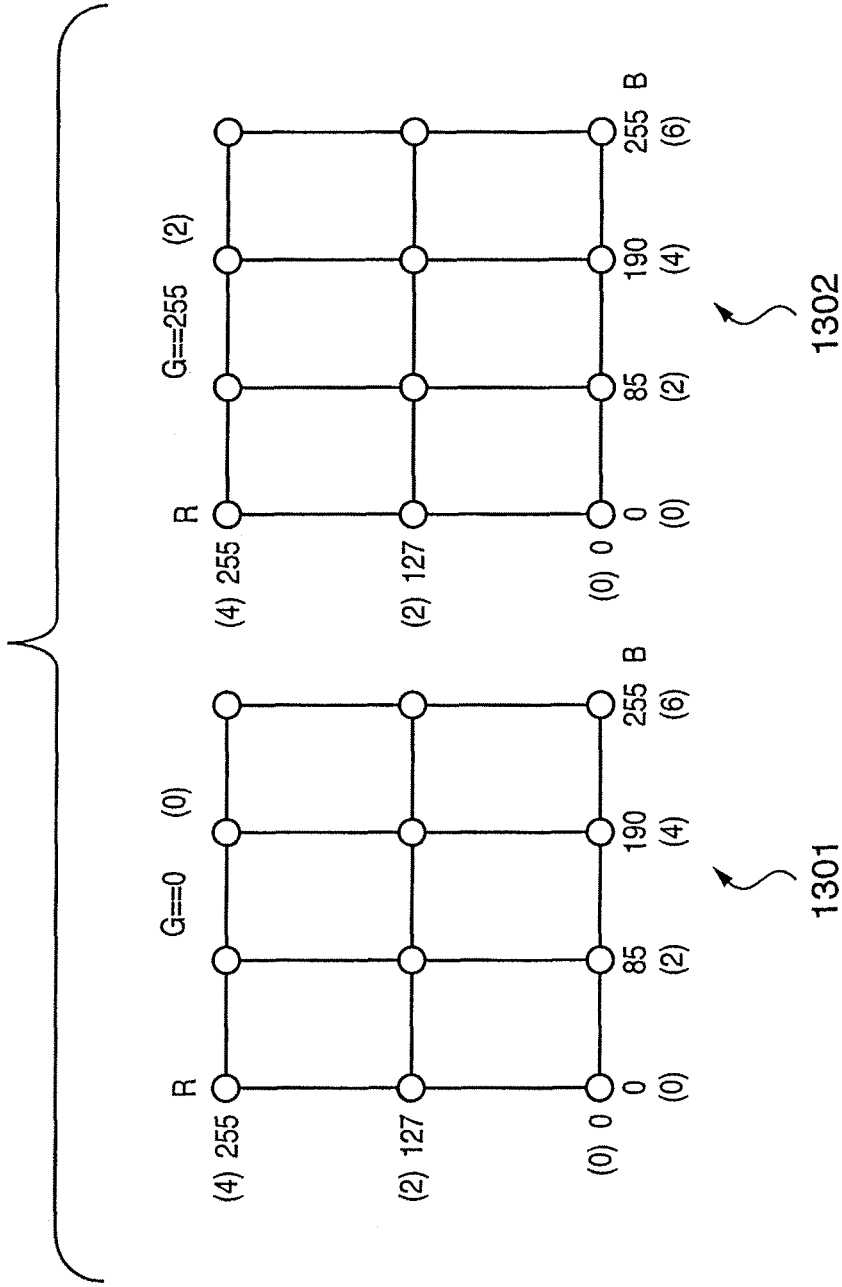
FIG. 13 is a view showing a reduced LUT in the first stage in the second embodiment.

Assume that processing in FIG. 10 is executed for an LUT (see FIG. 2) in which the number of grid points along the R, G, and B axes is 5×3×7 in an initial state before thinning-out. In the first stage (first loop), a reduced LUT (shown in FIG. 13) having 3×2×4 grid points respectively along the R, G, and B axes is created. The remaining 81 (=5*3*7−3*2*4=105−24) grid points are thinned out. For the thinned-out grid points, difference data (shown in FIG. 14) between output values in the reduced LUT (FIG. 13) and grid point values in the original LUT (FIG. 2) are created. In the difference table of FIG. 14, no difference data is necessary for grid points which are not thinned out and remain in the reduced LUT, and corresponding fields are blank. Difference data are registered at circled grid points.

For example, when grid points are positioned as shown in FIG. 2 along the three axes of the initial LUT, a grid point [2:1:4] in the original LUT corresponds to input data (127, 128,190). Since the grid point number along the second axis is odd, this grid point is thinned out from the original LUT. Difference data is the difference between an output value C′

(127,128,190) in the reduced LUT (FIG. 13) to the input data (127,128,190), and C[2:1:4] in the original LUT (FIG. 2).

Figure 15:
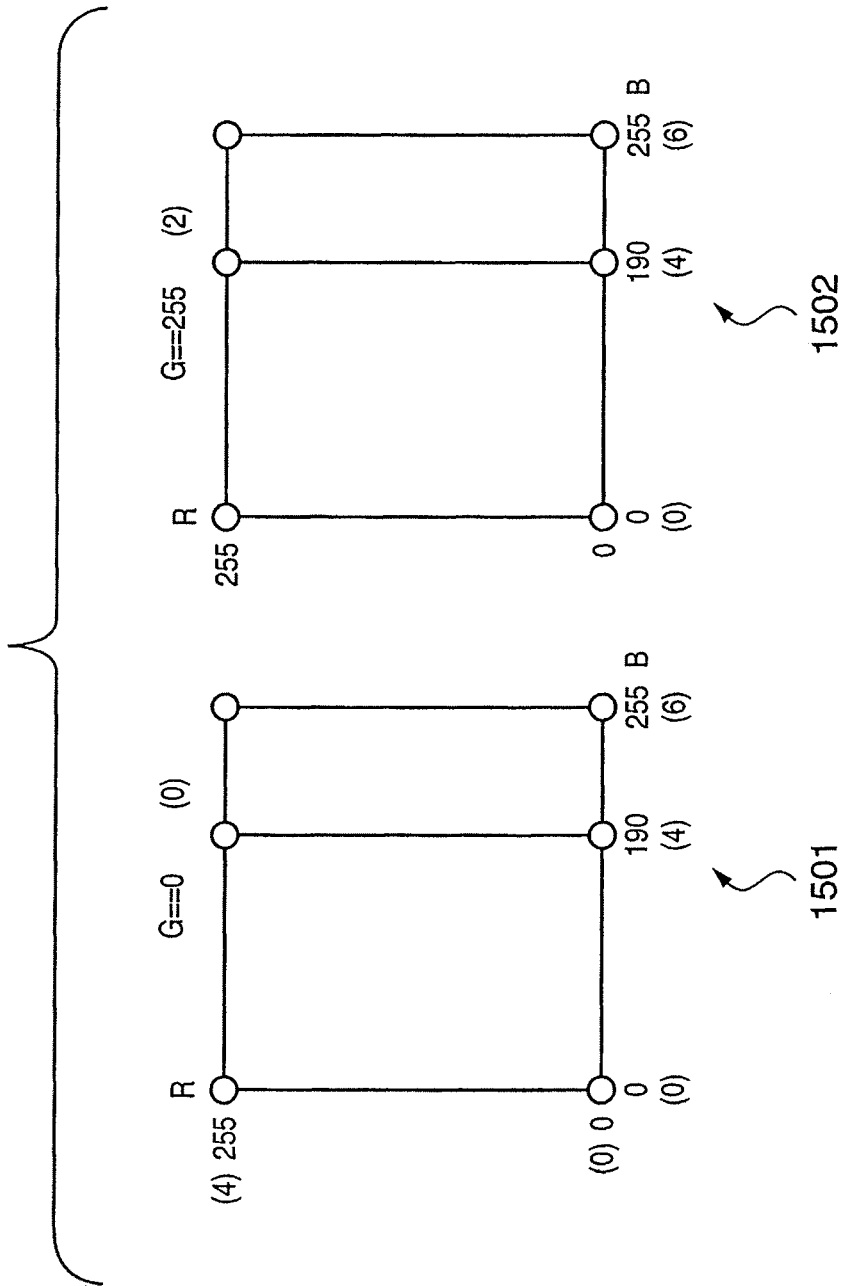
FIG. 15 is a view showing a reduced LUT in the second stage in the second embodiment.
Figure 16:
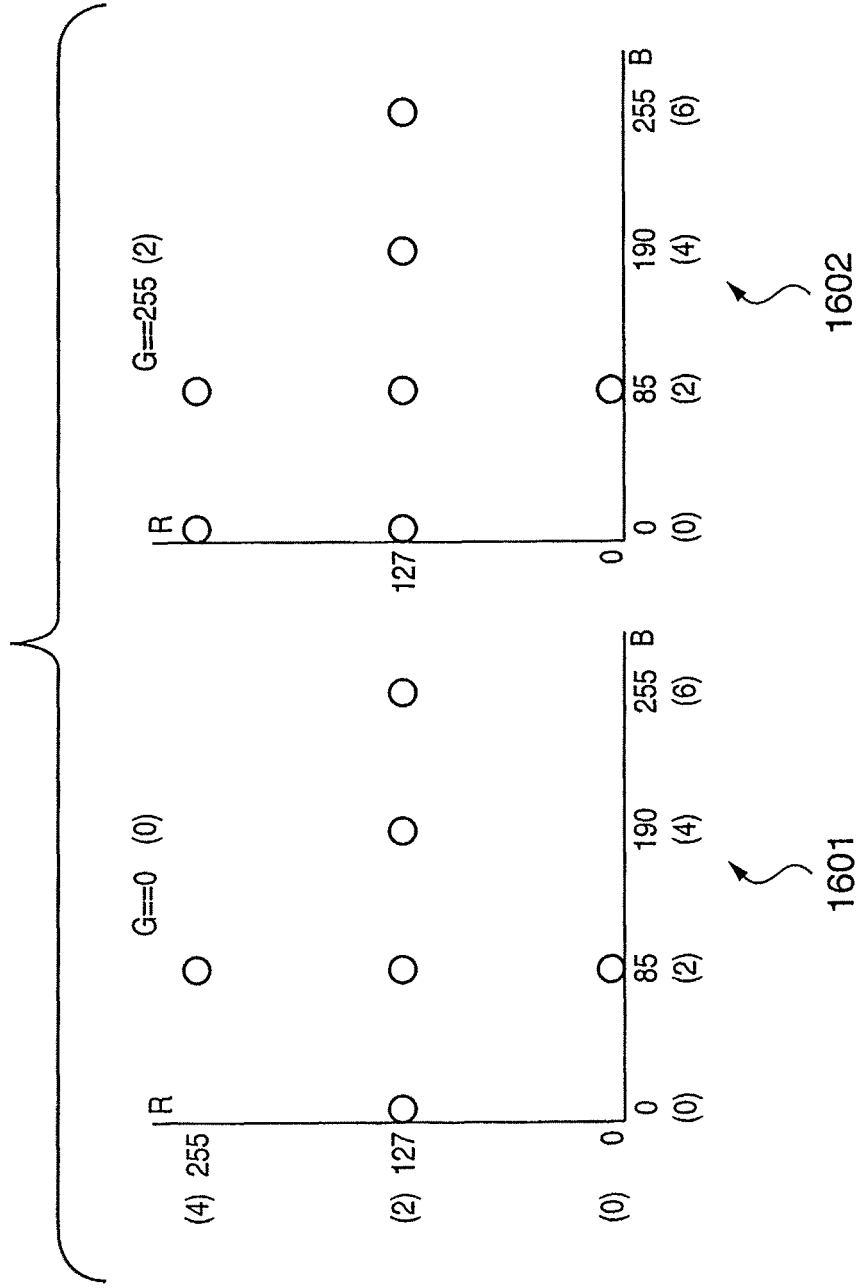
FIG. 16 is a view showing difference data in the second stage in the second embodiment.

In the second stage (second loop), the reduced LUT (FIG. 13) of 3×2×4 grid points created in the first stage serves as an original LUT to create a reduce LUT (FIG. 15) of 2×2×3 grid points. The remaining 12 (=3*2*4−2*2*3=24−12) grid points are thinned out. For the thinned-out grid points, difference data (FIG. 16) between outputs in the reduced LUT of 2×2×3 grid points, and original grid point values are created. The creation method is the same as that in the first stage.

Figure 17:
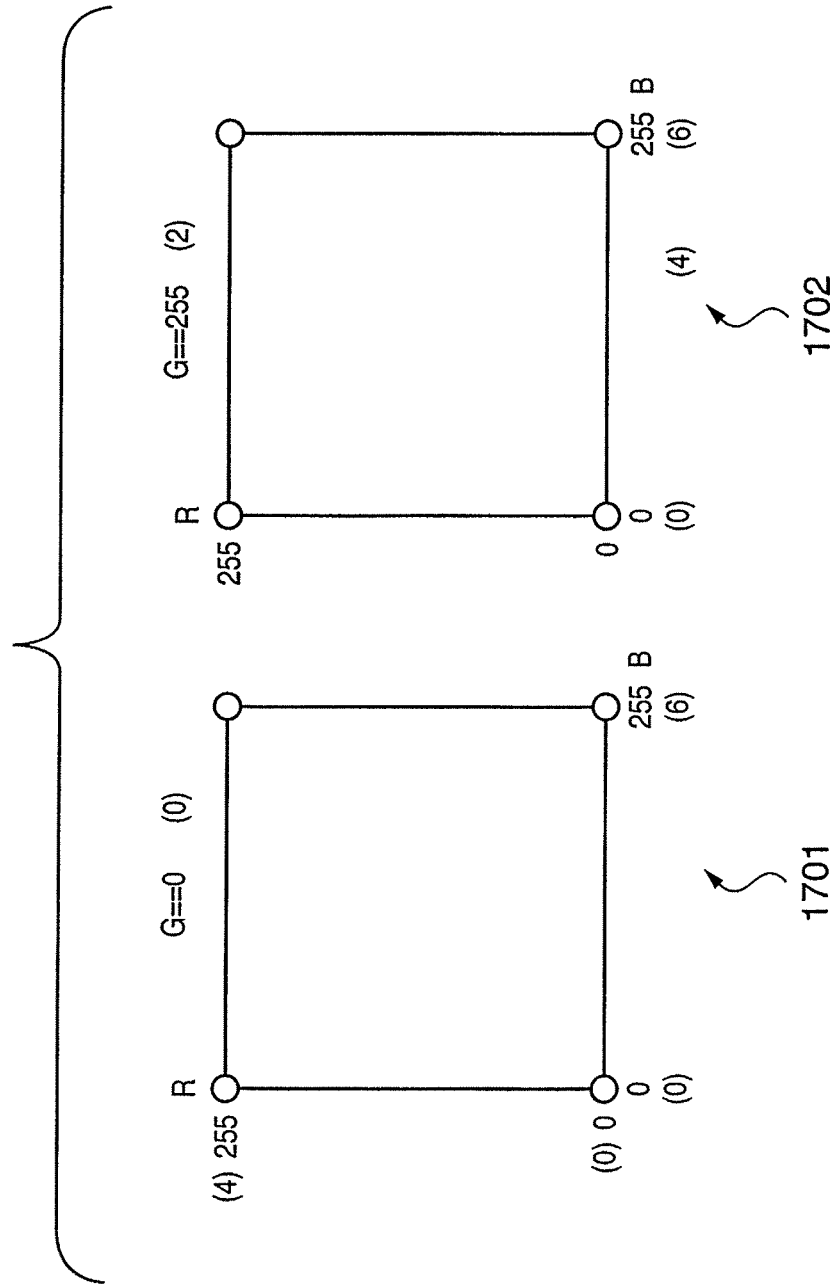
FIG. 17 is a view showing a reduced LUT in the third stage in the second embodiment.
Figure 18:
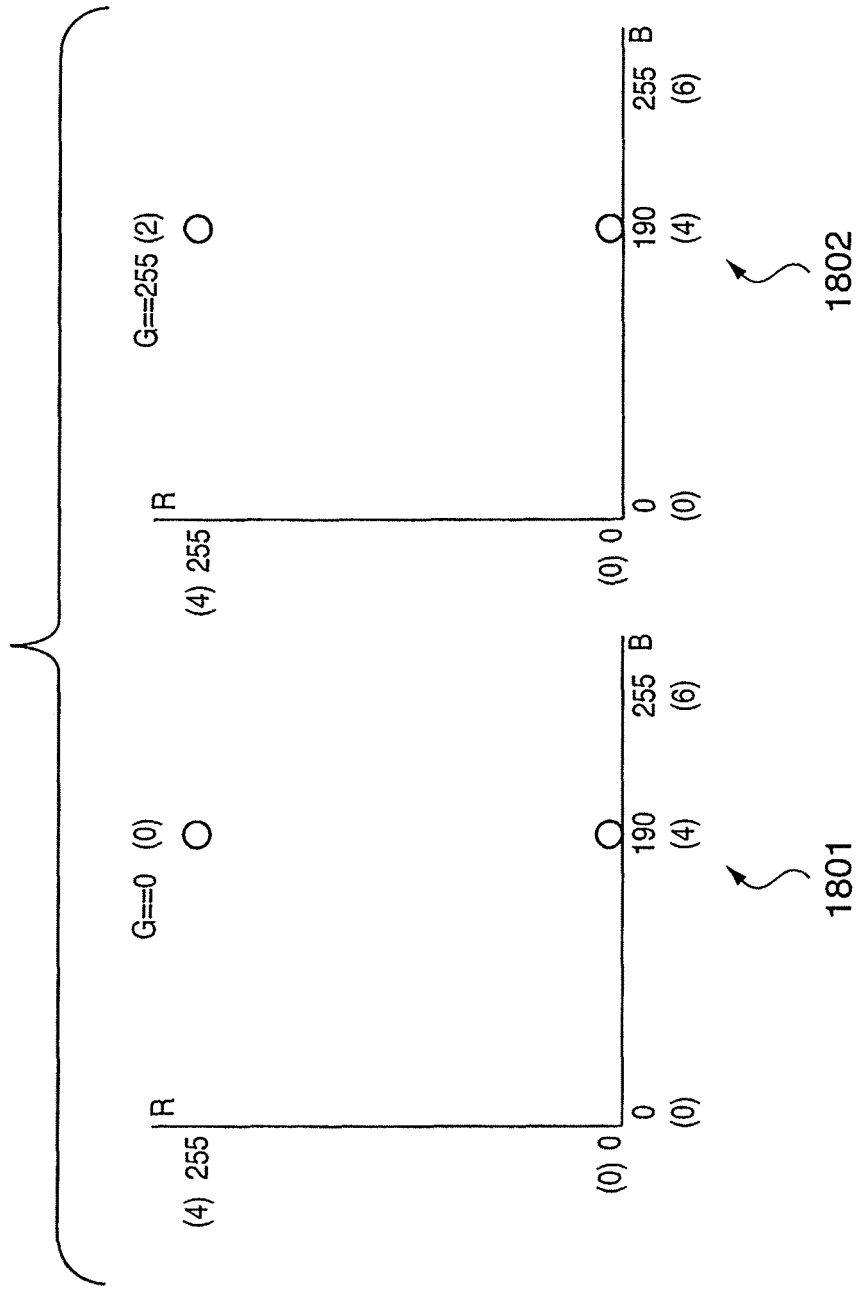
FIG. 18 is a view showing difference data in the third stage in the second embodiment.

In the third stage (third loop), the reduced LUT (FIG. 15) of 2×2×3 grid points created in the second stage serves as an original LUT to create a reduce LUT (FIG. 17) of 2×2×2 grid points. For the remaining 4 (=2*2*3 2*2*2=12−8) grid points, difference data (FIG. 18) between outputs in the reduced LUT of 2×2×2 grid points, and original grid point values are created.

Then, processing ends because 2×2×2 grid points of the reduced LUT cannot be reduced any more (S203).

Processing in FIG. 10 converts most difference data into values near 0, greatly increasing the compression ratio of lossless compression using run length coding or the like, similar to the first embodiment. Even if the above-described processing in FIG. 10 is executed, the total data amount of the reduced LUT obtained finally and difference tables created in the respective stages is equal to the data amount of the initial LUT. This method is related to processing to convert grid point value values as pre-processing for efficient conversion. The processing itself is not compression processing to reduce the data amount. After this conversion, the converted data is compressed.

Figure 14:
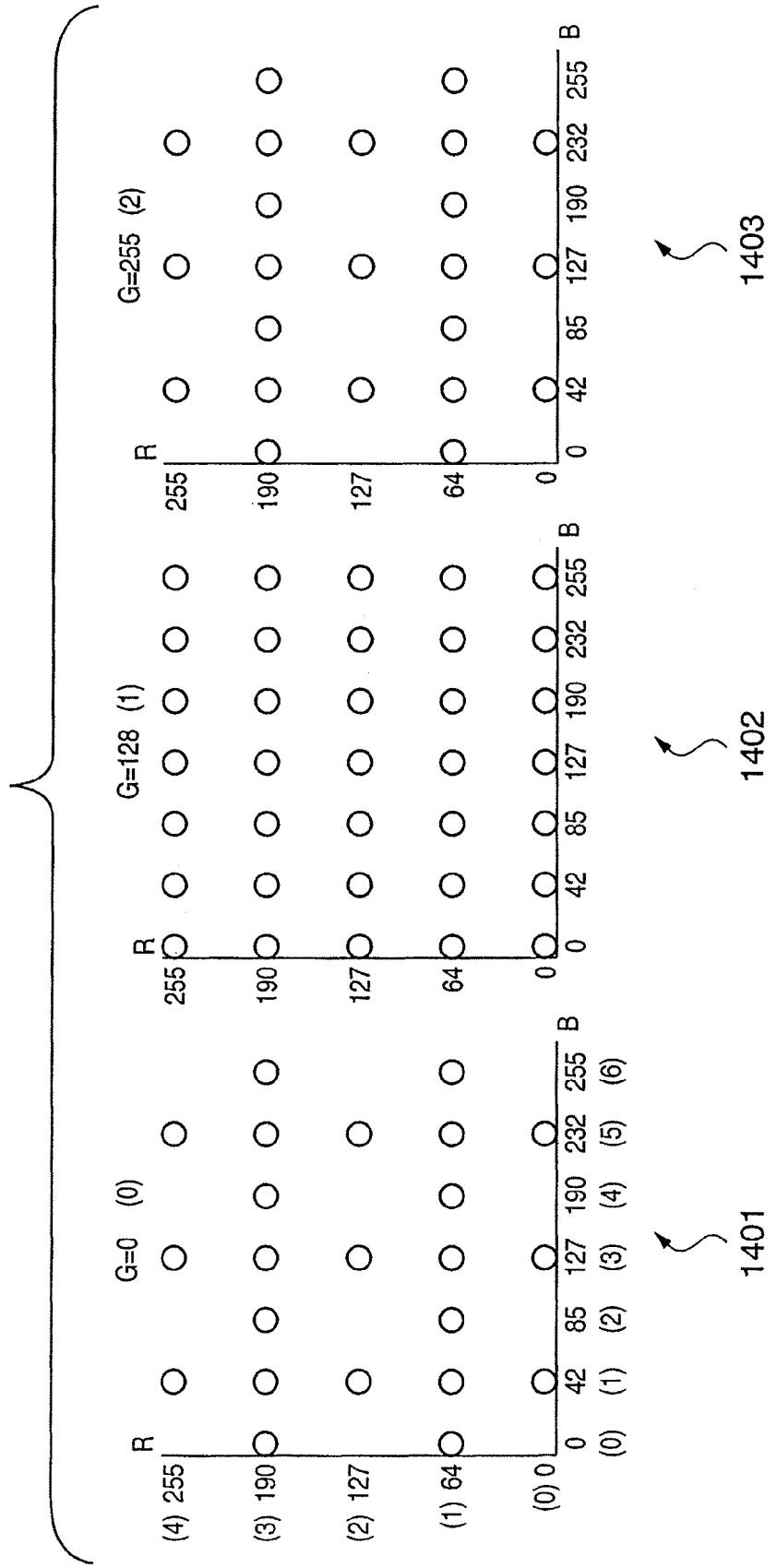
FIG. 14 is a view showing difference data in the first stage in the second embodiment.

Only one stage of the processing can be effectively executed, but it is more effective to repetitively execute the processing until the number of grid points in the reduced LUT decreases to 2. Executing only one stage means ending LUT conversion processing at the end of the first step S205 without looping the processing in FIG. 10. For example, the stage when the reduced LUT in FIG. 13 and the difference table in FIG. 14 are generated from the LUT in FIG. 2 corresponds to 1-stage processing.

When the numbers of grid points are different between the coordinate axes (three axes in this example) of the input space, they do not decrease to 2 at the same time for all the axes. In this case, while the number of grid points is kept at 2 for an axis whose number of grid points decreases to 2, the number of grid points is decreased by the above-described processing for an axis whose number of grid points is larger than 2. Processing ends when the numbers of grid points along all the axes decrease to 2. The input space is the space of input parameters of the LUT. For example, for a conversion table from R, G, and B to Y, M, C, and K, the input space is the RGB color space.

Figure 19:
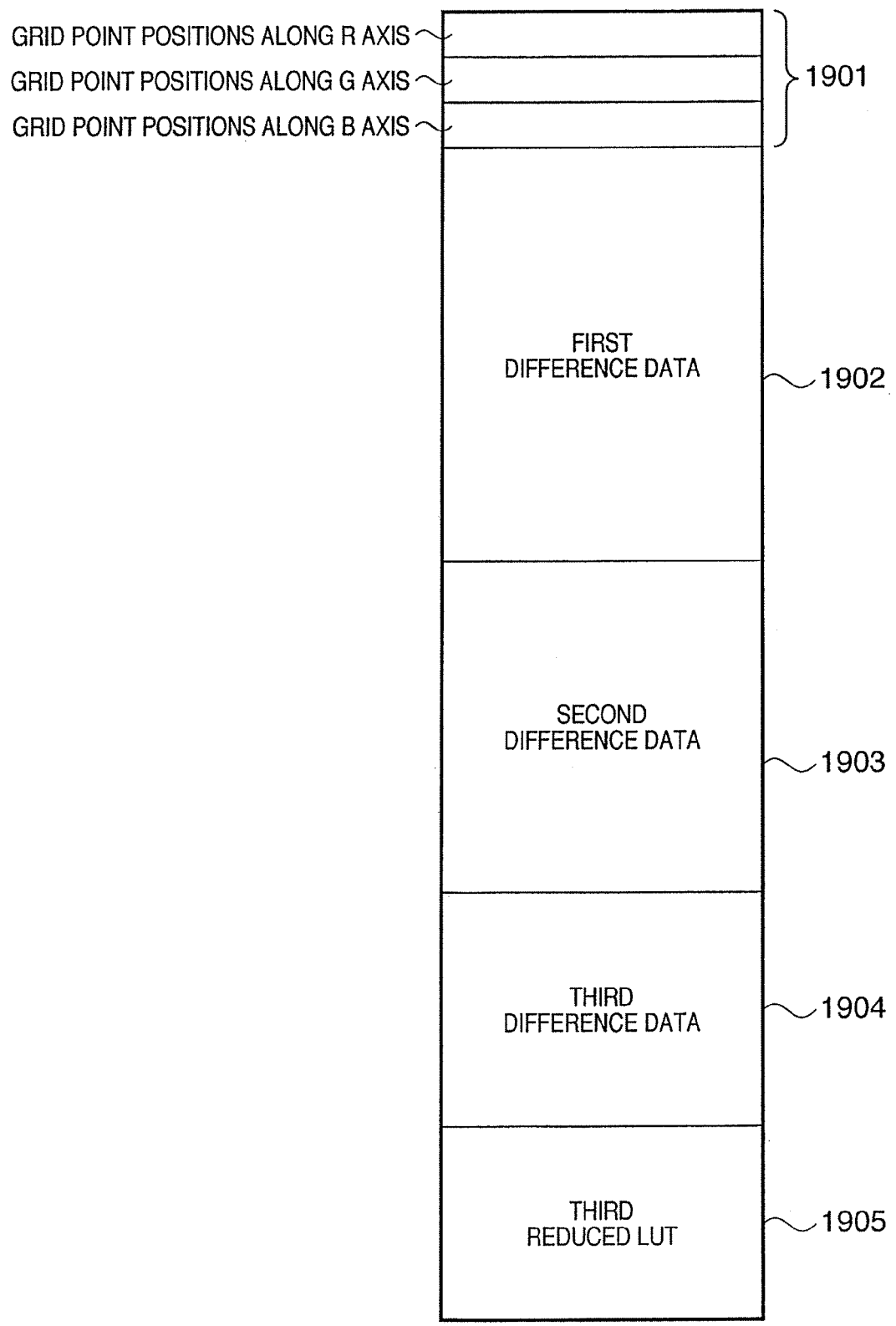
FIG. 19 is a view showing data to be compressed in the second embodiment.

The entire data in FIG. 19 may be compressed. Alternatively, grid point positions 1901 where the data amount is small and the effect of compression is expected to be ineffective may be excluded to compress the remaining data.

<Restore Processing>

LUT restoring requires the number of grid points and their positions along the respective axes of the initial LUT. The values (grid point positions 1901 along the respective axes) must be stored together with difference data 1902 to 1904 and a reduced LUT 1905, as shown in FIG. 19. The original LUT has grid point positions along the respective axes, as shown in FIG. 4, and keeps holding them. When grid points are regularly thinned out, the LUT can be restored by storing only grid point positions along the respective axes of the initial LUT. Restore processing is performed when, for example, the printer driver receives print settings and selects an LUT corresponding to the input print settings, similar to the first embodiment.

Restore processing is done as follows using the number of grid points in the reduced LUT, difference data, and the number of grid points and their positions in the initial LUT. The number of difference data and the grid point positions of the respective difference data can be finalized from grid point positions in the original LUT. This is because grid point positions are thinned out regularly and grid point positions in each stage can be determined from grid point positions in the initial LUT. Grid point positions in the reduced LUT in each stage, i.e., grid point positions in the difference table are attained. In this way, grid point positions in the reduced LUT and those in a preceding LUT are obtained from grid point position information of the original LUT. Using the reduced LUT, an output value upon receiving a grid point position in a preceding LUT (i.e., a grid point position in the difference table) can be obtained by interpolating a grid point value. The output value and difference data at a corresponding grid point position are merged (added) to acquire a grid point value in an LUT before one stage. The LUT before one stage is an LUT before thinning-out processing. This processing is executed for all grid points in the LUT before one stage, restoring the LUT before one stage.

This processing is repeated until the number of grid points becomes equal to that of grid points in the initial LUT (original LUT), completely restoring the LUT.

Figure 39:
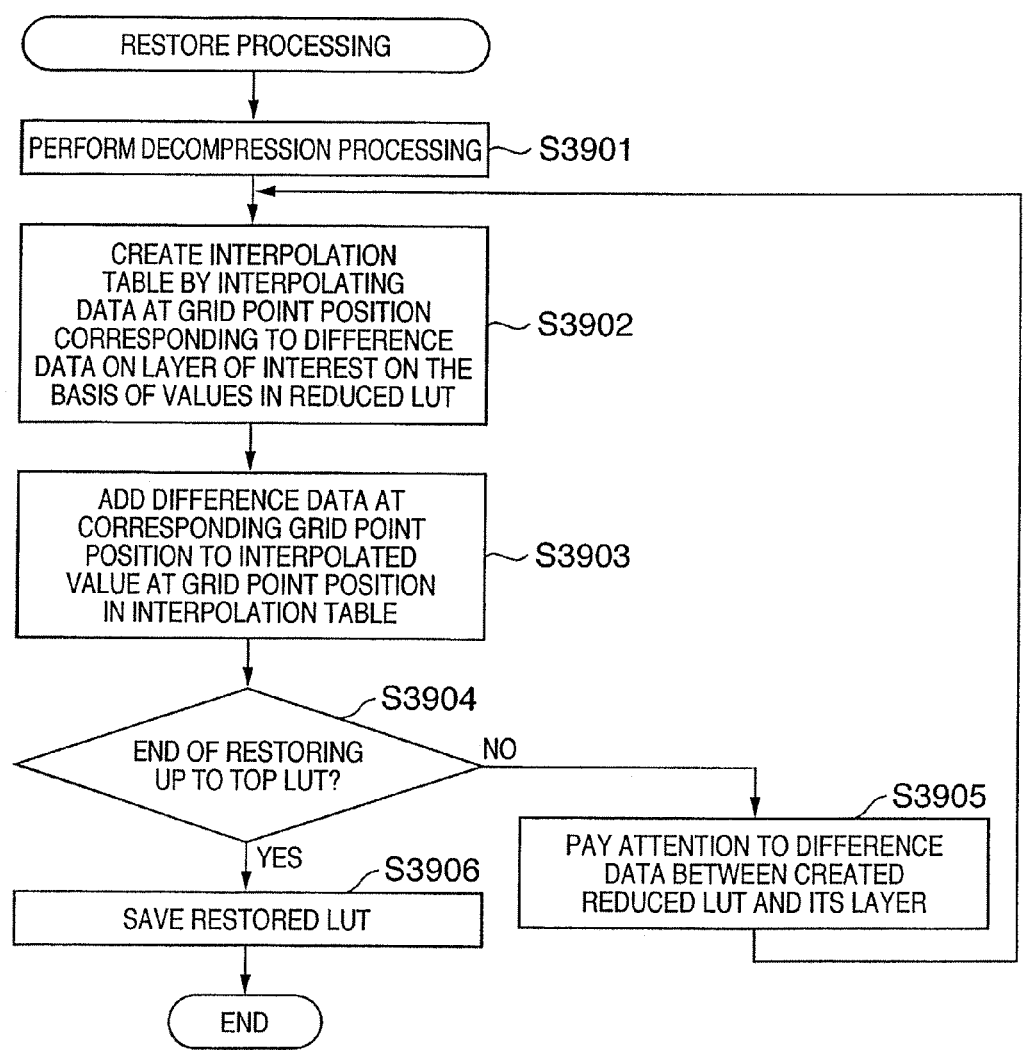
FIG. 39 is a flowchart of restore processing in the second embodiment.

FIG. 39 shows an example of the procedures of restore processing. In this example, an interpolation value table is formed from only data obtained by interpolation, and corresponding differences are added to restore an LUT preceding by one stage without restoring every grid point. First, compressed data is decoded (S3901). Prior to restoring, the grid point position of a reduced LUT in each stage is determined and stored on the basis of the grid point thinning-out method. Attention is paid to a difference table at the bottom. This difference table is called a difference table of interest. The reduced LUT is an LUT restored at a certain point.

An interpolation table is created by interpolating the values of grid points corresponding to grid points in the difference table of interest on the basis of values in the reduced LUT contained in the decoded data (S3902). Difference data at grid point positions in the difference table of interest are added to corresponding grid point values in the interpolation table (S3903). It is determined whether restoring ends up to the top table (S3904). For example, if the number of grid points in the restored LUT coincides with that of grid point positions contained in the grid point positions 1901, it can be determined that the top LUT has been restored. If restoring ends, the restored LUT is saved (S3906); if no restoring ends, attention is paid to a difference table preceding by one stage from the current difference table (S3905). At this time, the reduced LUT is the restored LUT. Then, the processing returns to step S3902.

Figure 20:
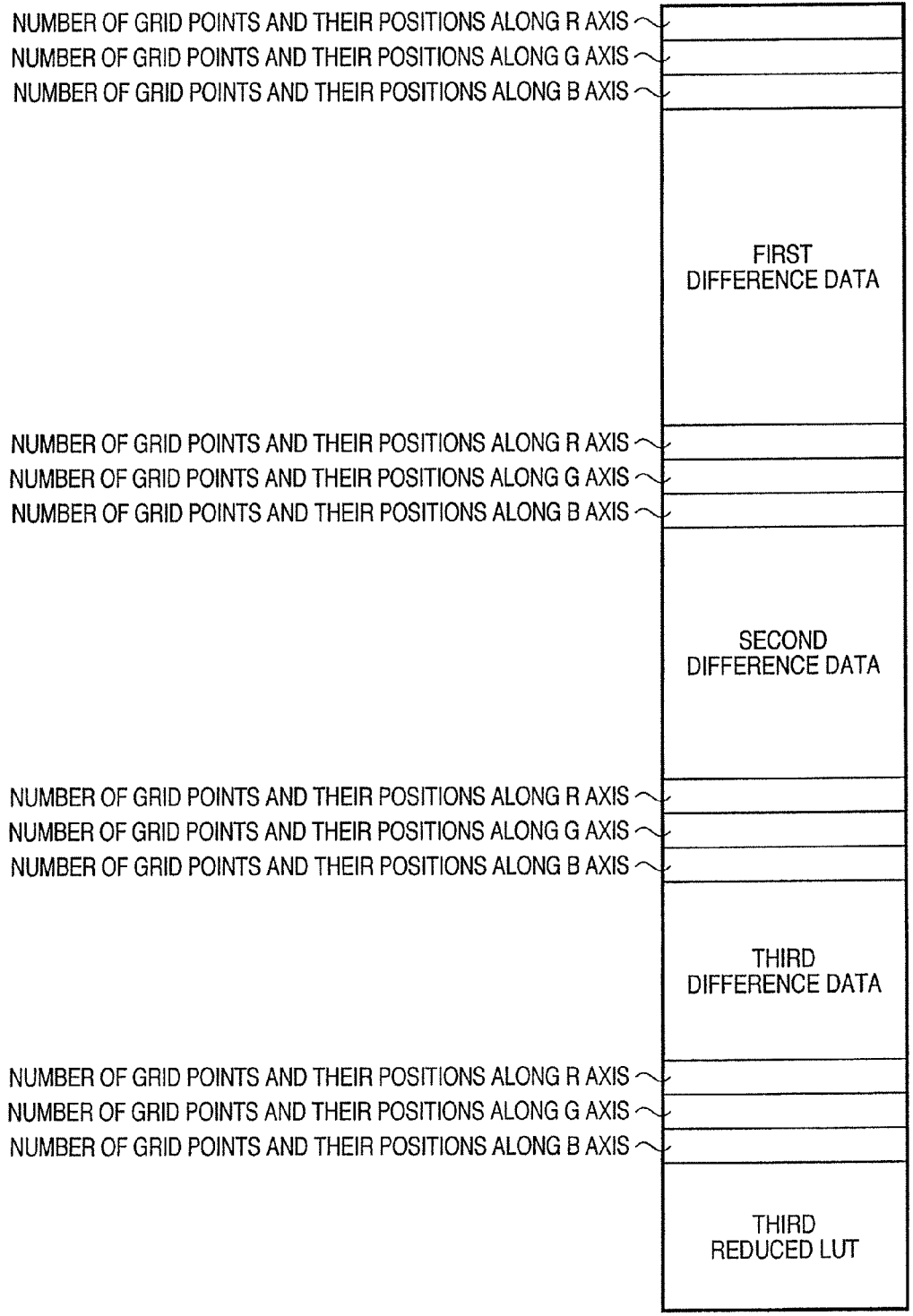
FIG. 20 is a view showing data to be compressed in the second embodiment.

Grid point positions restored by difference data in each stage can also be stored together with the difference data, as shown in FIG. 20. In the above example, R axis positions (0 and 255), G axis positions (0 and 255), and B axis positions (0, 190, and 255) are stored as grid point positions along the respective axes together with difference data created in the third stage. R axis positions (0, 127, and 255), G axis positions (0 and 255), and B axis positions (0, 85, 190, and 255) are stored as grid point positions together with difference data created in the second stage. R axis positions (0, 64, 127, 190, and 255), G axis positions (0, 128, and 255), and B axis positions (0, 42, 85, 127, 190, 232, and 255) are stored as grid point positions together with difference data created in the first stage.

Grid point positions in a reduced LUT in each stage can also be sequentially stored, as shown in FIG. 20. The format is common to the above case, but the meaning of each grid point position is different. The above-mentioned LUT stores R axis positions (0 and 255), G axis positions (0 and 255), and B axis positions (0 and 255) which are grid point positions along the respective axes in a reduced LUT in the third stage. The LUT stores R axis positions (0 and 255), G axis positions (0 and 255), and B axis positions (0, 190, and 255) which are grid point positions along the respective axes in a reduced LUT in the second stage. The LUT stores R axis positions (0, 127, and 255), G axis positions (0 and 255), and B axis positions (0, 85, 190, and 255) which are grid point positions along the respective axes in a reduced LUT in the first stage. The LUT stores R axis positions (0, 64, 127, 190, and 255), G axis positions (0, 128, and 255), and B axis positions (0, 42, 85, 127, 190, 232, and 255) which are grid point positions in the initial LUT.

By storing grid point positions in these formats, how differential processing was done can be determined from grid point position information. Even if the method of thinning out grid points in differential processing, and the number of grid points to be thinned out change, an LUT can be restored from thinned-out data. Further, processing to determine grid point positions in a reduced LUT in each stage prior to restoring can be omitted.

As described above, the second embodiment can convert each grid point value to a value close to 0 by converting a color conversion LUT into a difference table representing the difference from an interpolation value. This can increase the compression ratio of the LUT in lossless compression.

[Third Embodiment]

The third embodiment is related to a method of calculating the difference between two different LUTs. The two LUTs must have the same dimensions. The difference is calculated to increase the compression ratio, so corresponding grid point values must be approximate to each other.

An image forming apparatus stores a plurality of LUTs corresponding to conditions such as the paper type, quality, and color for use. The image forming apparatus selects a proper LUT in accordance with conditions, and executes color conversion processing. An apparatus with a plurality of color conversion LUTs may have some LUTs which are not identical but highly similar to each other. The third embodiment increases the compression ratio using similarity. According to the third embodiment, LUTs having the same number of axes, the same number of grid points along each axis, and the same number of output data are grouped into one among all LUTs used by, e.g., the printer driver. LUTs belonging to the same group are so combined as to effectively increase the compression ratio, and the difference between the LUTs is calculated. E represents the number of LUTs in one group.

The difference between LUTs in the third embodiment will be explained. As shown in FIG. 26, a table Cab 2603 is created by calculating the differences between grid point values in one of two, LUT Ca 2601 and LUT Cb 2602 having the same number of grid points along each axis, and grid point values in the other LUT. The value of each record (grid point) in the table Cab 2603 is as follows:

Cab[i:j:k]←Ca[i:j:k]−Cb[i:j:k], i=0 to N−1, j=0 to M−1, and k=0 to L−1.

Figure 27:
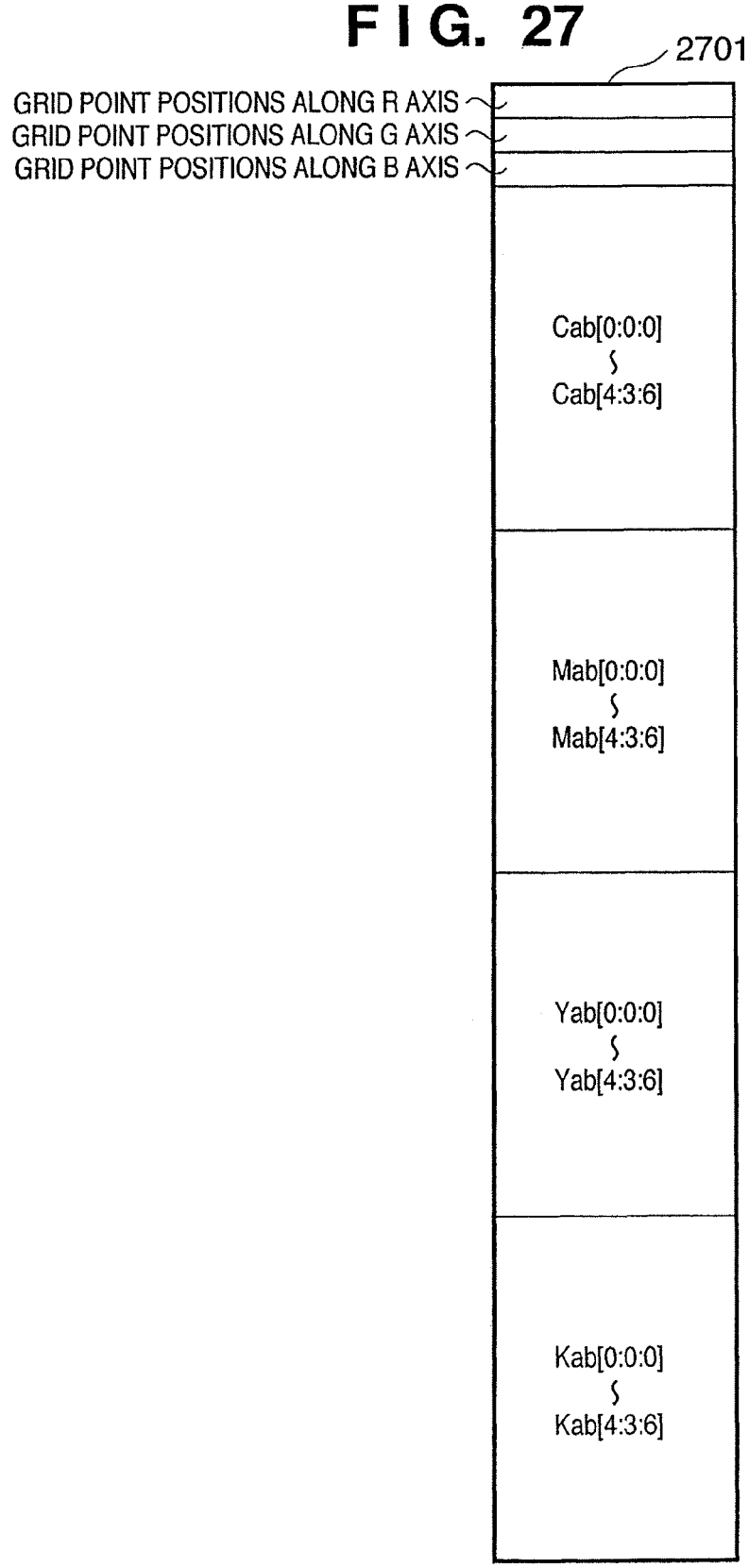
FIG. 27 is a view of exploding the difference between triaxial LUTs, which store a plurality of output data, into a one-dimensional table.

Cab[i:j:k] is called the difference LUT of Ca using Cb as a reference LUT. A difference LUT having undergone conversion processing is a differentially compressed LUT. An LUT simply compressed without calculating any difference is a non-differentially compressed LUT. Differential calculation in the third embodiment uses a difference obtained by the same calculation as that described in the first embodiment. When the LUT holds a plurality of grid point values at one grid point, the differences of the respective grid point values are calculated, and data concatenated as shown in FIG. 27 is compressed.

The compression ratio does not always increase even if the differentially compressed LUT is created for two proper LUTs. It is necessary to select a more effective combination from combinations capable of calculating the difference between LUTs. An example of this processing will be described.

<LUT Management Table>

Figure 24:
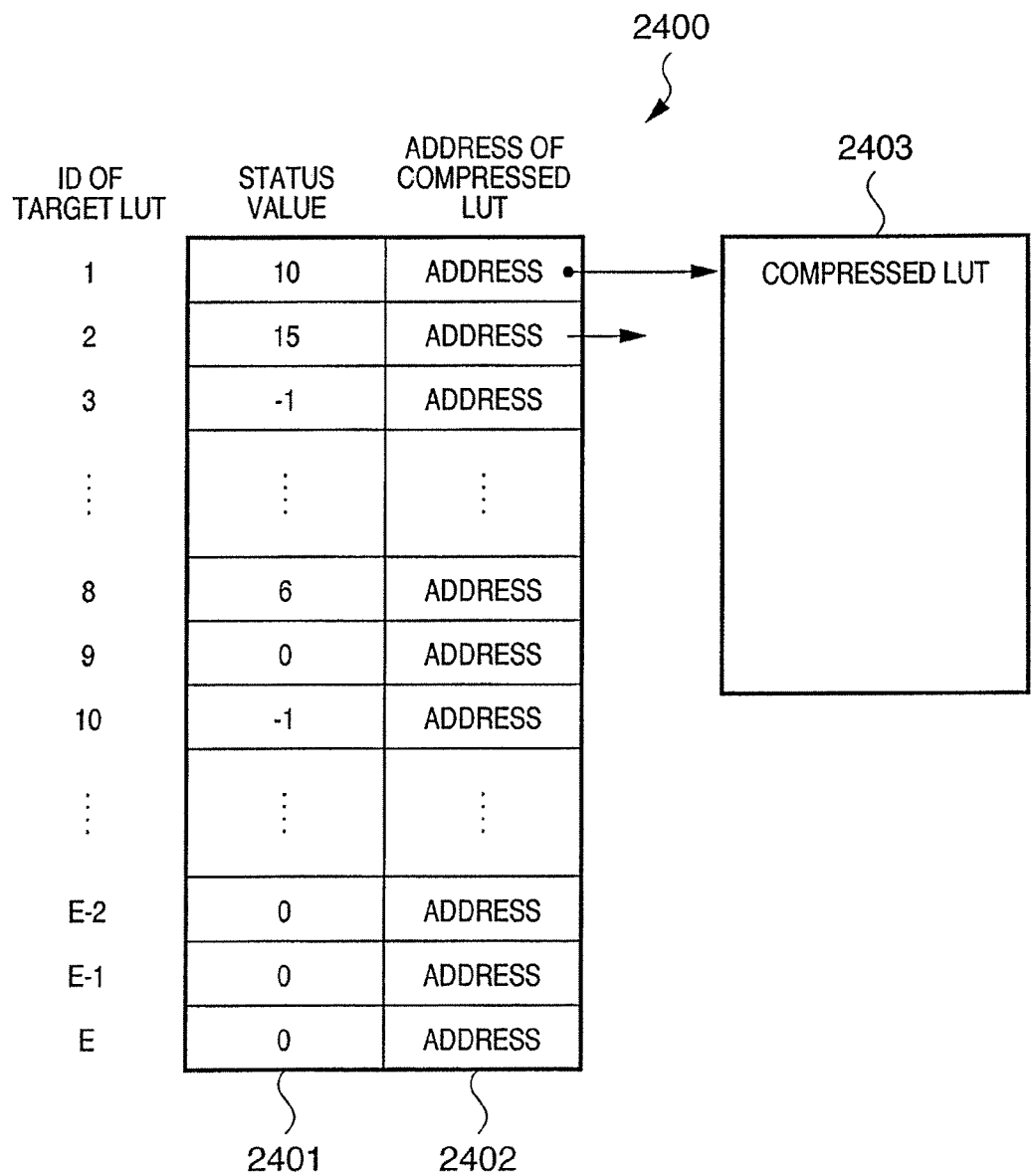
FIG. 24 is a view showing an LUT management table in the first processing.

The third embodiment uses an LUT management table as shown in FIG. 24 in order to manage a plurality of LUTs. An LUT management table 2400 contains E items corresponding to the number of LUTs in a group, and each item is formed from a status value 2401 representing the status of an LUT, and an address 2402 to an area where LUT data is stored. The turn of an LUT in the LUT management table 2400 is given by the ID of the LUT. The ID of the first LUT in the LUT management table is 1, numbers are assigned in the LUT management table, and the ID of the final LUT in the LUT management table is E. The status value 2401 in the LUT management table 2400 is 0 in the initial state. The status value "0" means that processing for an LUT is not finalized.

<Compression Processing>

Figure 21:
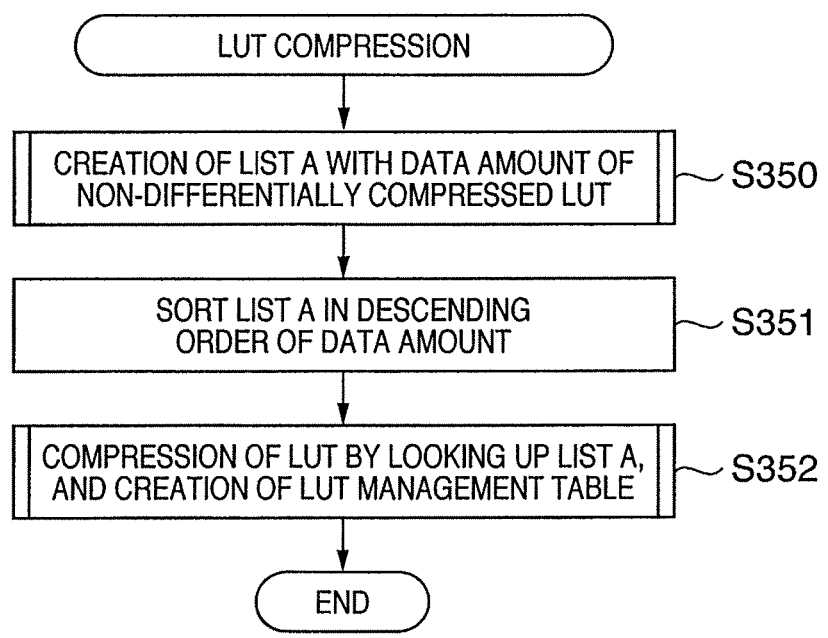
FIG. 21 is a main flowchart of the first processing in the third embodiment.

FIG. 21 is a main flowchart showing an example of processing to select a combination of LUTs subjected to differential compression and compress them. In the third embodiment, an LUT is compressed by the procedures in FIG. 21. Prior to FIG. 21, LUTs having the same dimension are selected, and an LUT management table is created for each group. Processing in FIG. 21 is executed for each group. The processing in FIG. 21 according to the third embodiment is made up of three processes: list A creation processing (step S350), list A sorting processing (S351), LUT conversion processing (S352), except for creation of an LUT management table.

Figure 22:
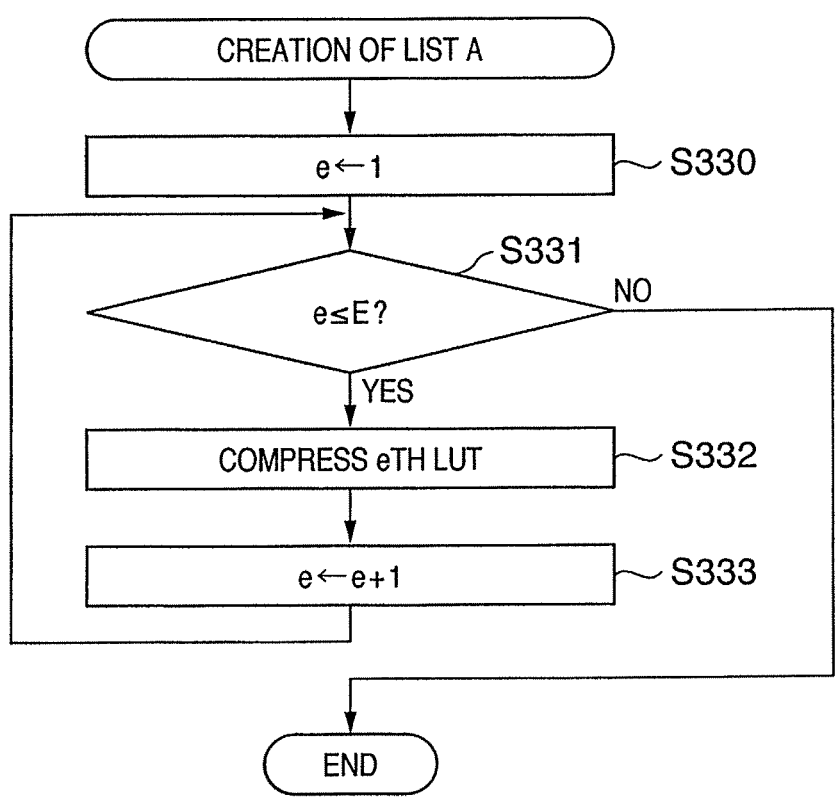
FIG. 22 is a partial flowchart of the first processing in the third embodiment.

The flowchart in FIG. 22 shows detailed processing procedures in step S350. In steps S330 to S333, all LUTs in a group are non-differentially compressed by looking up the LUT management table, creating list A as shown in FIG. 25. In list A, the IDs of the respective LUTs and data amounts when non-differentially compressing the LUTs are registered in the processing order.

Referring back to FIG. 21, items in list A are rearranged in the descending order of non-differentially compressed data amounts in step S351. Then, step S352 is executed.

Figure 23:
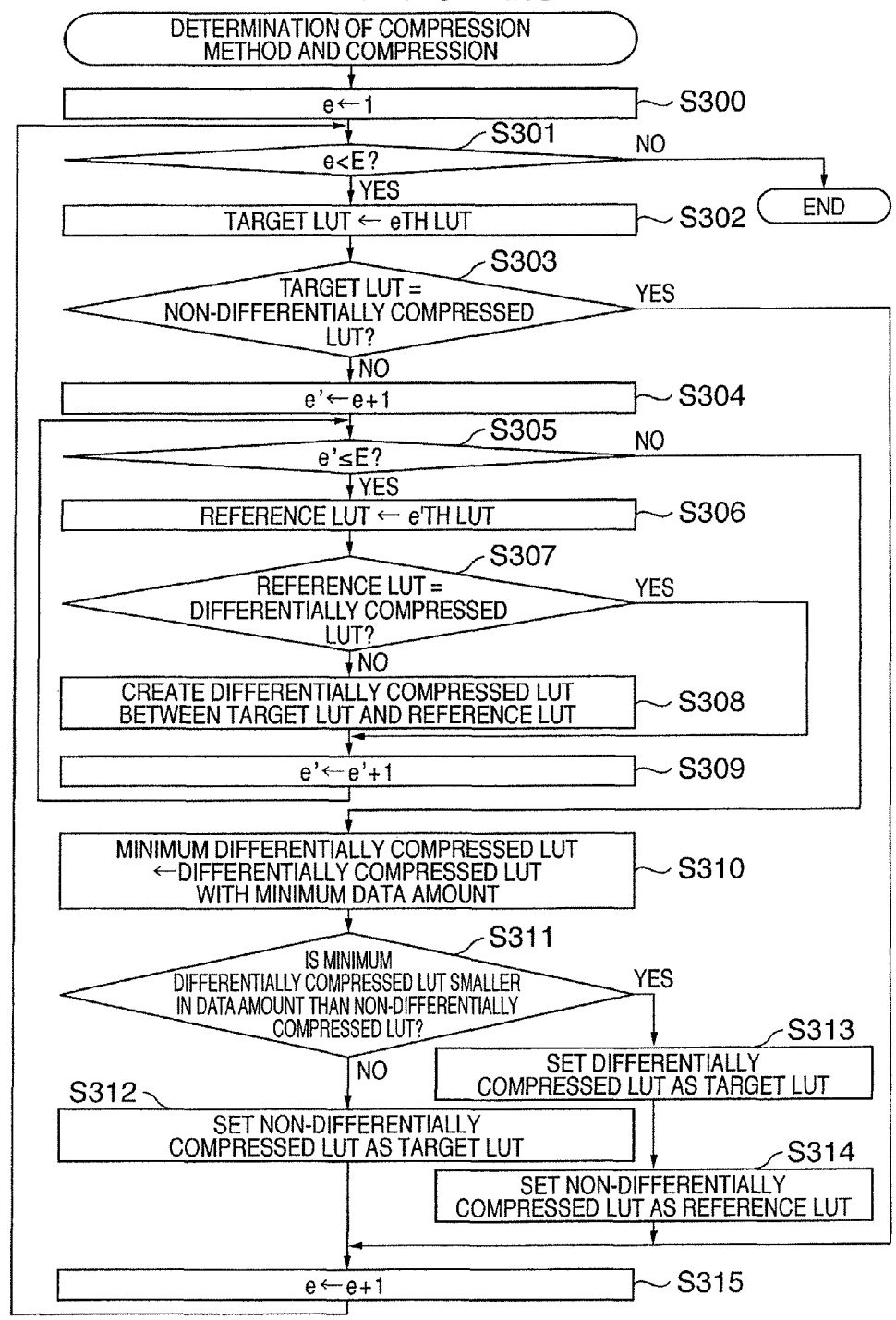
FIG. 23 is a partial flowchart of the first processing in the third embodiment.

The flowchart in FIG. 23 shows detailed processing procedures in step S352. An initial value "1" is substituted into the variable e which is allocated in the DRAM and represents the number (starting from 1) of a target LUT in list A (S300). It is determined on the basis of the value of the variable e whether LUTs have been processed up to the final LUT in the group (S301). If the processing has not ended, the eth LUT in list A is selected as an LUT (target LOT) to be processed (S302). The target LUT can be specified by, for example, storing its ID at a predetermined address. In this example, such an LUT is simply called a target LUT. A status value corresponding to the ID of the target LUT is read by looking up the LUT management table. If the status value is −1, the target LUT is a non-differentially compressed LUT. If so, an LUT next to the current target LUT among LUTs registered in list A is set as a new target LUT (S315).

If the status value is not −1, i.e., the target LUT is not a non-differentially compressed LUT in step S303, an LUT registered next to the target LUT in list A is set as a reference LUT. That is, a value obtained by adding one to the value of the variable e is substituted into the variable e' representing the number of a reference LUT in list A (S304). If the resultant value does not exceed the upper limit of list A (YES in S305), an LUT represented by the variable e' in list A is set as a reference LUT (S306). Similar to the target LUT, the reference LUT can be specified by storing its ID in a predetermined area such as the DRAM.

Whether the reference LUT is a differentially compressed LUT is determined on the basis of a status value corresponding to the reference LUT by looking up the LUT management table (S307). If the status value is neither 0 nor −1, the reference LUT is a differentially compressed LUT. If the reference LUT is a differentially compressed LUT, an LUT registered next to the current reference LUT in list A is set as a new reference LUT (S309). If the reference LUT is not a differentially compressed LUT, the differentially compressed LUT between the target and reference LUTs is created (S308). The created differentially compressed LUT is saved in association with the IDs of the target and reference LUTs. The above processing is repeated until the final LUT in list A serves as a reference LUT (S305). By repeating the processing, LUTs differentially compressed using reference LUTs which are all LUTs smaller in size upon non-differential compression than a target LUT are obtained for one target LUT.

A differentially compressed LUT smallest in size among differentially compressed LUTs created by the above processing is selected as the minimum differentially compressed LUT (S310). Unselected difference LUTs are deleted. The differentially compressed LUT can be selected by saving its address in a specific memory area representing the selected LUT. The size of the minimum differentially compressed LUT is compared with that of the non-differentially compressed LUT of the target LUT (S311). If the data amount of the differentially compressed LUT is smaller, it is determined to store the differentially compressed LUT as the compressed LUT of the target LUT. In this case, the address of the minimum differentially compressed LUT selected in step S310 is written in the address field for the target LUT in the LUT management table, and the ID of the reference LUT used to create the minimum differentially compressed LUT is written in the status value field (S313). The reference LUT of the differentially compressed LUT is determined as a non-differentially compressed LUT. Hence, the address of the non-differentially compressed LUT is written in the address field for the reference LUT in the LUT management table, and "−1" is written in the status value (S314). In this fashion, the status value of the differentially compressed LUT is the ID of the reference LUT, and "−1" is written as the status value of the non-differentially compressed LUT.

If the size of the minimum differentially compressed LUT is equal to or larger than that of the non-differentially compressed LUT of the target LUT, it is determined to set the non-differentially compressed LUT as the target LUT. In this case, "−1" is written as the status value of the target LUT in the LUT management table. The address of the non-differentially compressed LUT of the target LUT is written in the address field (S312). The address of the non-differentially compressed LUT is registered in list A.

Processing from step S301 to S315 is repeated until the second final LUT in list A serves as a target LUT. Finally, the completed LUT management table and an LUT compressed by the selected method are saved. The address of the compressed LUT contained in the LUT management table may be another information such as the file name as long as the information specifies the compressed LUT.

<Restore Processing>

Figure 40:
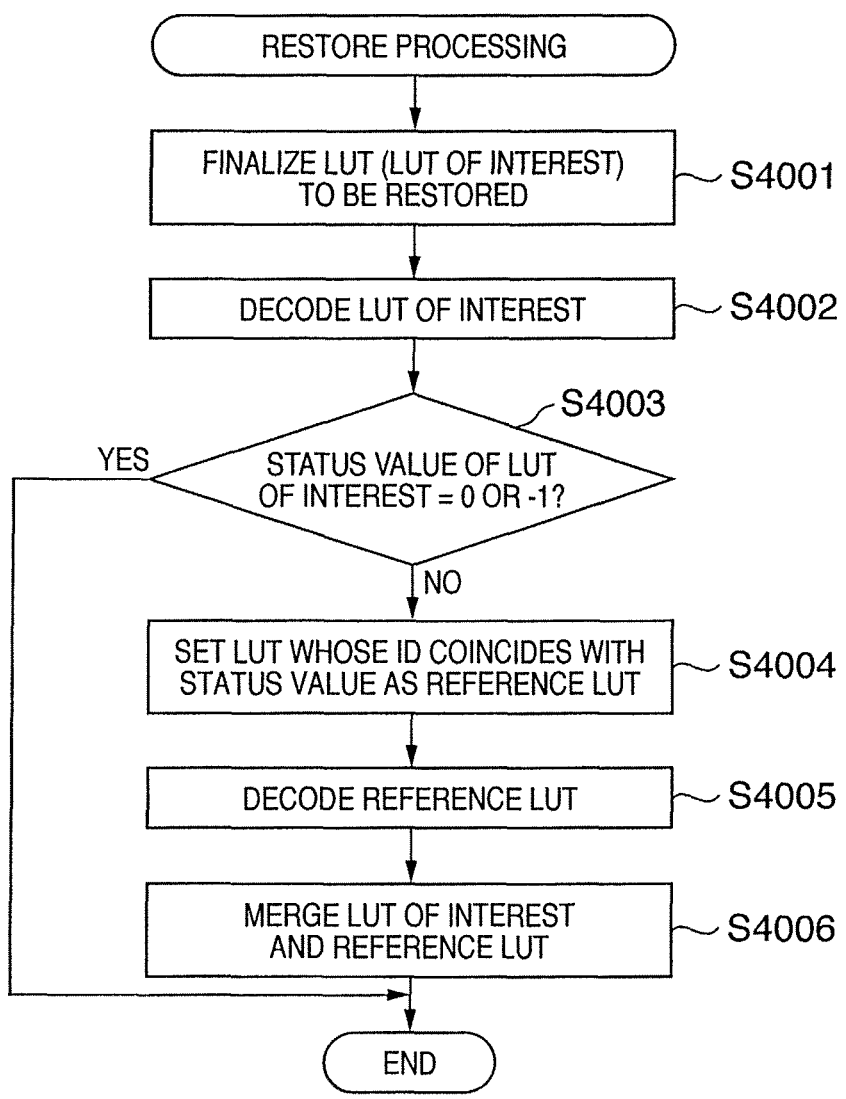
FIG. 40 is a flowchart of restore processing in the third embodiment.

Restoring of an LUT converted by the above method requires information representing which LUT serves as a difference LUT and which LUT serves as a reference LUT. Thus, the LUT management table in FIG. 24 must be stored together with compressed data of LUTs, and transferred to an apparatus which decodes a compressed LUT. FIG. 40 shows the procedures of restore processing. If print settings (conditions such as the paper type, print quality, and coloring material for use) are designated, an LUT (LUT of interest) to be restored for use in color conversion processing is finalized (S4001). If the status value of the LUT of interest in the LUT management table is 0 or −1 (YES in S4003), the LUT of interest is a non-differentially compressed LUT and is restored by decoding the single non-differentially compressed LUT (S4002). If the status value of the LUT of interest in the LUT management table is neither 0 nor −1 (NO in S4003), the LUT of interest is a differentially compressed LUT. In this case, an LUT whose ID coincides with the status value of the LUT of interest is acquired from the LUT management table (S4004). The non-differentially compressed reference LUT is decoded (S4005). The reference LUT is a non-differentially compressed LUT, and can be restored by decoding. The LUT of interest which is a differentially compressed LUT is decoded, and the target and reference LUTs are merged (S4006), restoring an LUT. LUT restore processing employs the same processing as merge processing described in the first embodiment.

In this way, when the target LUT is a non-differentially compressed LUT and the reference LUT is a differentially compressed LUT, no differentially compressed LUT is set as a target LUT. This can prevent any differential loop which may occur when calculating two differences. This can simplify restore processing.

Since the size of a non-differentially compressed LUT is compared with that of a differentially compressed LUT and a smaller LUT is selected, the compression ratio becomes higher than in a case of compressing all LUTs by one method (non-differential compression or differential compression). These procedures can easily yield almost the optimal result.

[Modification to Third Embodiment]

Figure 28:
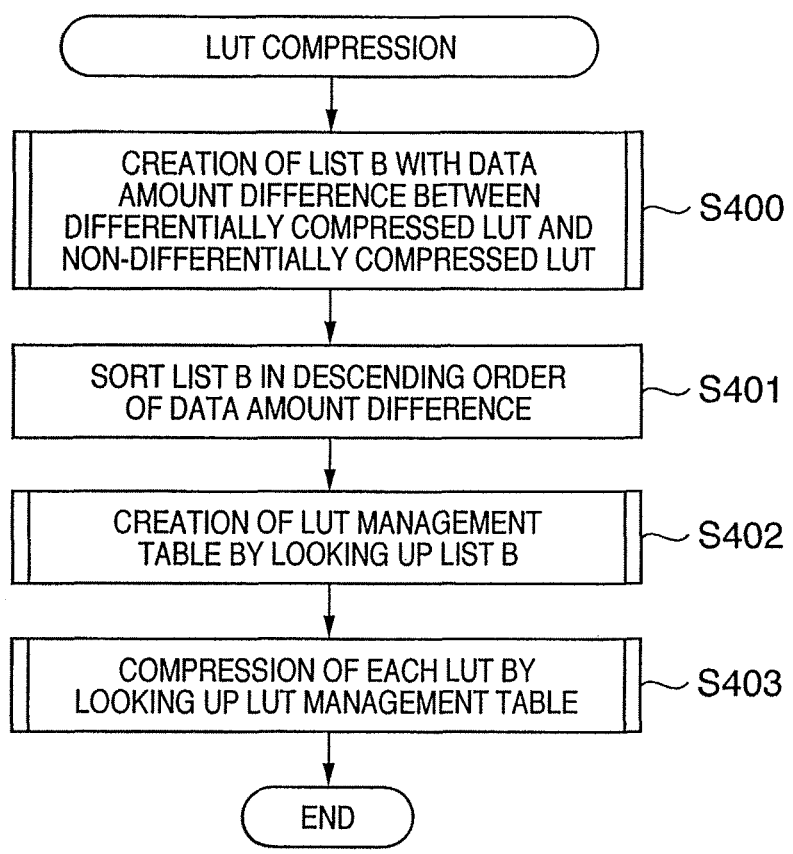
FIG. 28 is a main flowchart of the second processing in the third embodiment.

To obtain almost the optimal result, a combination of LUTs is selected by procedures shown in the flowchart of, FIG. 28. An LUT management table used in this processing stores the data amount in non-differential compression together with the status value and address, as shown in FIG. 32. In the initial state, all status values in the LUT management table are 0. In FIG. 28, list B (FIG. 33) of the data amount difference between a differentially compressed LUT and a non-differentially compressed LUT is created (S400), and list B is sorted by the data amount (S401). The LUT management table in FIG. 32 is created by looking up list B (S402). Finally, each LUT is compressed by looking up the LUT management table (S403). When list B is created, a non-differentially compressed LUT and differentially compressed LUT for each LUT have been created. After the non-differentially compressed LUT and differentially compressed LUT are saved, an LUT satisfying conditions is only selected from saved compressed LUTs and registered in the LUT management table in step S403.

Figure 29:
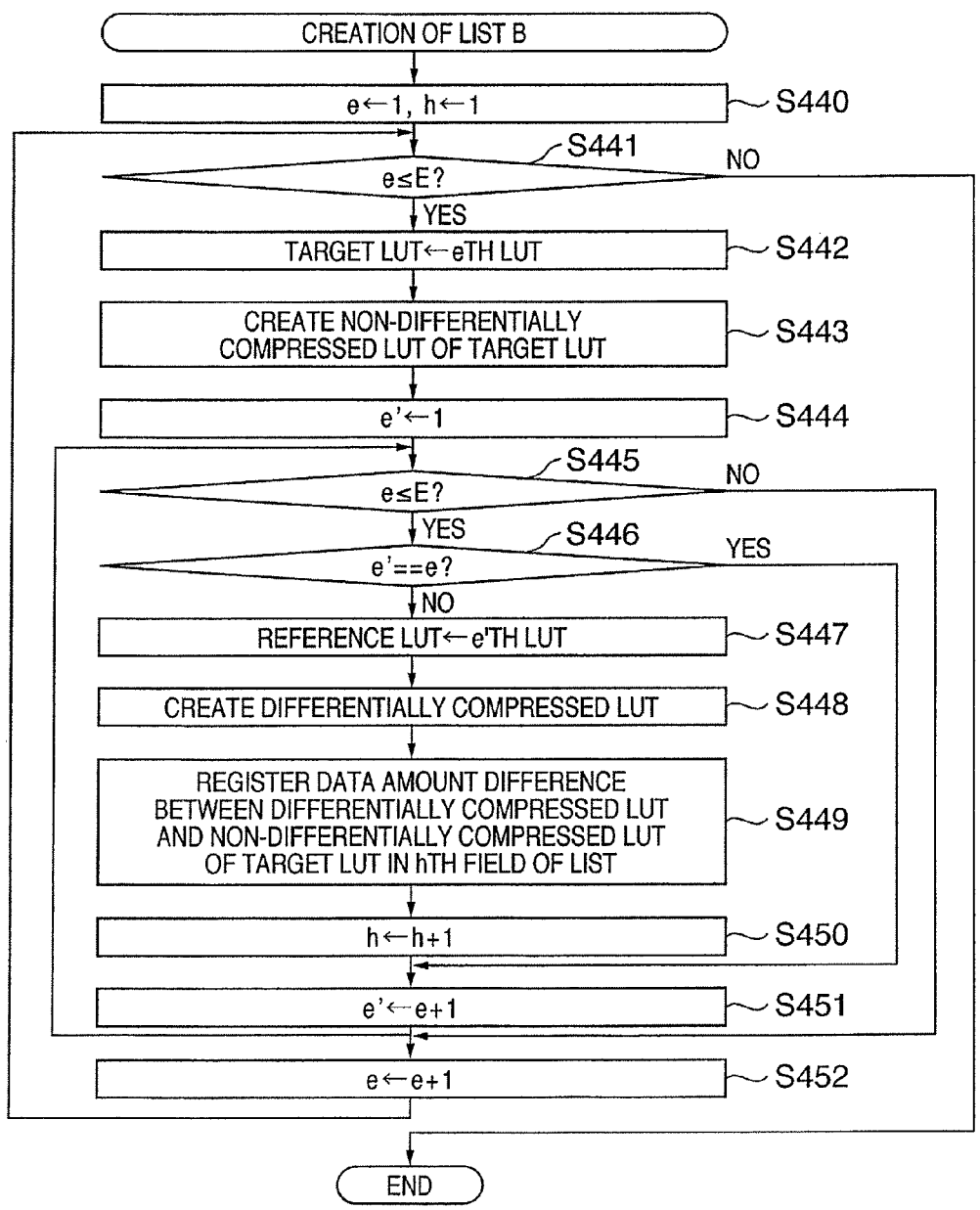
FIG. 29 is a partial flowchart of the second processing in the third embodiment.

The flowchart in FIG. 29 shows detailed processing procedures in step S400. The variable e represents the ID of a target LUT, and the variable e' represents that of a reference LUT. The variable h represents the number of a record in list B. First, an initial value "1" is substituted into the variables e and h (S440). The following processing is repeated for all LUTs (YES in S441). An LUT whose ID coincides with the value of the variable e is selected as a target LUT (S442). The non-differentially compressed LUT of the target LUT is created (S443). The size of the non-differentially compressed LUT must be saved. The non-differentially compressed LUT itself is desirably saved, but may be temporarily discarded. An LUT differentially compressed using a reference LUT, which is an LUT in the group other than the target LUT, is created sequentially from a reference LUT of a smaller ID (S447 and S448). The size of the differentially compressed LUT created in step S448 is subtracted from the saved size of the non-differentially compressed LUT of the target LUT. The difference is registered in the data amount difference field of an item designated by the variable h in list B (S449). If the non-differentially compressed LUT is larger, the difference value is positive. A positive data amount represents a decrease in data amount by differential compression from that by non-differential compression. At this time, the IDs of the corresponding target and reference LUTs are also registered in list B in association with the LUT size difference.

This processing is repeated for all LUTs in the group. More specifically, all non-differentially compressed LUTs in the group, and differentially compressed LUTs of all combinations of a target LUT and a reference LUT are created. The data amount difference from a data amount when non-differentially compressing the target LUT of each differentially compressed LUT is calculated. List B as shown in FIG. 33 is created by registering the difference and the IDs of the target and reference LUTs in association with each other. Letting E be the number of LUTs in the group, the number of items in list B is E*(E−1).

Figure 30:
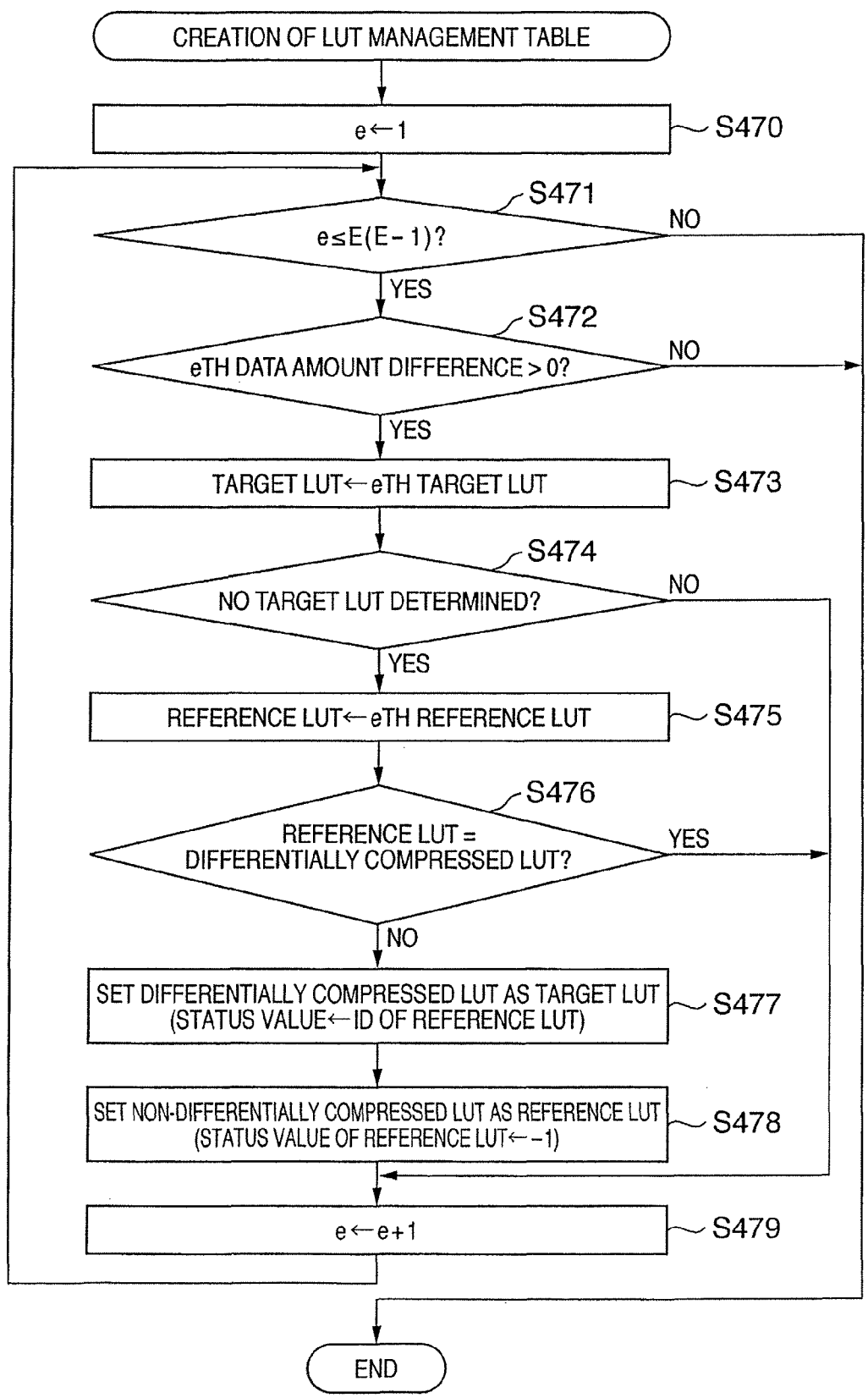
FIG. 30 is a partial flowchart of the second processing in the third embodiment.

Referring back to FIG. 28, items in list B are rearranged in the descending order of data amount differences (S401). An LUT to be differentially compressed and its reference LUT are determined in the order of rearranged list B (S402). The flowchart in FIG. 30 shows detailed processing procedures to create an LUT management table in step S402. In FIG. 30, the variable e represents an item number assigned sequentially from 1 in list B. The procedures in FIG. 30 proceed while incrementing the value of the variable e and scanning list B. In step S471, it is determined whether entire list B has been processed. If the data amount difference registered in an item represented by the variable e in list B is larger than 0 (i.e., the non-differentially compressed LUT is larger), an ID registered in the target LUT field of the item represented by the variable e in list B is set as that of the target LUT. By looking up the LUT management table, it is determined whether no compression method of the target LUT has been determined, i.e., the status value is 0. If the status value is not 0, it has already been determined that the target LUT is a differentially or non-differentially compressed LUT, and the process branches to step S479 to advance the item of interest to the next item in list B.

If no compression method of the target LUT has been determined, the value in the reference LUT field represented by the variable e in list B is selected as the ID of the reference LUT (S475). By looking up the LUT management table, it is determined whether the reference LUT is a differentially compressed LUT, i.e., the status value is neither 0 nor −1 (S476). If the reference LUT is not a differentially compressed LUT, the compression ratio of the target LUT becomes highest when differentially compressing the target LUT using the reference LUT. Hence, the ID of the reference LUT is written as the status value of the target LUT in the LUT management table (S478). Then, "−1" representing non-differential compression is written as the status value of the reference LUT in the LUT management table (S479). This processing is repeated for entire list B. Consequently, status values are written in the LUT management table. In processing of FIG. 30, the status values of some LUTs remain 0. An LUT whose status value is 0 at the end of processing in FIG. 30 is non-differentially compressed because no differential compression is selected as the compression method.

Similar to the third embodiment, the status value is the ID of the reference LUT when the target LUT is differentially compressed, and "−1" when the target LUT is non-differentially compressed. Also similar to the third embodiment, the modification does not differentially compress an LUT used as a reference LUT, preventing any difference loop. The modification can also simplify restore processing.

Figure 31:
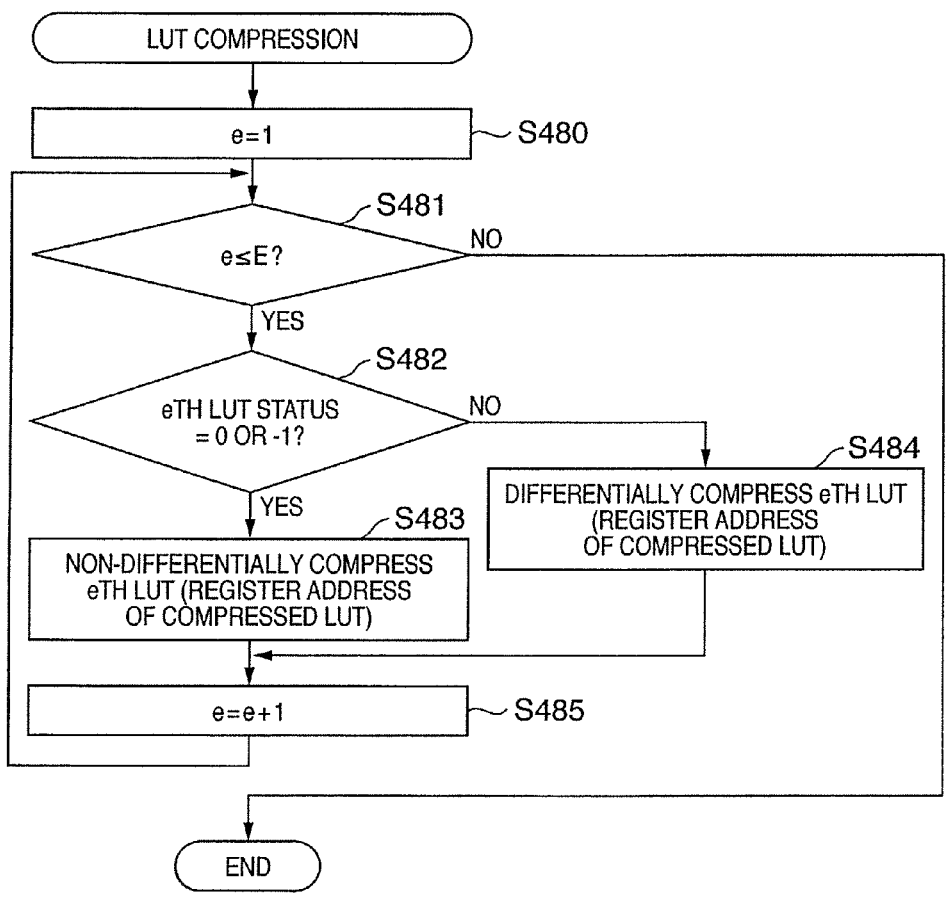
FIG. 31 is a partial flowchart of the second processing in the third embodiment.

Finally in step S403, LUTs whose status values are 0 or −1 are non-differentially compressed, and the remaining LUTs are differentially compressed using reference LUTs which are LUTs having IDs represented by status values. The flowchart in FIG. 31 shows detailed processing procedures in step S403. The address of a differentially compressed LUT is registered in the address field of the LUT management table. If non-differentially and differentially compressed LUTs created by the procedures in FIG. 29 are saved in association with target and reference LUTs, they can be used in steps S483 and S484 of FIG. 31.

<Restore Processing>

Restoring of an LUT converted by the above method requires information representing which LUT serves as a difference LUT and which LUT serves as a reference LUT. Thus, an LUT management table prepared by deleting a compressed LUT data amount from the LUT management table in FIG. 32 must be stored together with compressed data of LUTs, and transferred to an apparatus which decodes a compressed LUT. Restore processing is the same as that in the third embodiment.

[Fourth Embodiment]

The fourth embodiment is an effective combination of the first and second embodiments. A reduced LUT and difference table are created by the method of the second embodiment, and processing stops even before the number of grid points decreases to 2. The axial difference for all the axes is calculated by the method of the first embodiment for a remaining reduced LUT having two or more grid points. The obtained difference table and the obtained reduced LUT for which the axial difference for all the axes is calculated are compressed.

Alternatively, the axial difference for all the axes is calculated for a reduced LUT. A data amount compressed together with the difference data is compared with a data amount obtained by further reducing the reduced LUT and compressing the difference data and the reduced LUT for which the axial difference for all the axes is calculated. If the data amount does not reduce even by proceeding reduction, the difference table, and a reduced LUT before further reduction for which the axial difference for all the axes is calculated are compressed. If the data amount reduces, the processing is repeated until the data amount further decreases. In this fashion, the methods of the first and second embodiments can be optimally combined.

These procedures can further increase the compression ratio.

[Fifth Embodiment]

The fifth embodiment is an effective combination of the first and third embodiments. An LUT having undergone differential processing along the three axes is processed by the method of the third embodiment. First, all LUTs undergo differential processing along the three axes described in the first embodiment. Then, the difference between LUTs is calculated as described in the third embodiment for LUTs having undergone differential processing along the three axes. That is, both target and reference LUTs subjected to inter-LUT difference calculation are LUTs having undergone differential processing along the three axes.

As described in the first embodiment, even if the method of the first embodiment is executed, the LUT data amount does not change, and only the grid point value changes to a differentiated value. The third embodiment is executable regardless of the contents of the grid point value in the LUT. For this reason, the LUT conversion methods of the first and third embodiments are applicable without any change. These methods are merely series-executed. Compression processing is done upon completion of the two conversion processes. Differential processing along the three axes by the method of the first embodiment is done when performing non-differential compression by the method of the third embodiment.

The fifth embodiment increases the similarity between LUTs belonging to a group by executing differential processing along the three axes. Thus, the method according to the third embodiment becomes more effective.

[Sixth Embodiment]

The sixth embodiment is an effective combination of the second and third embodiments. All LUTs are converted by the method of the second embodiment, and each LUT is converted into a reduced LUT and difference data. The difference between effective LUTs is calculated by the method of the third embodiment among LUTs processed by the method of the second embodiment. Since the method of the second embodiment does not change the data amount, the method of the third embodiment is applicable similarly to the method for LUTs before processed by the method of the second embodiment. The difference between an LUT reduced by the method of the second embodiment and LUT data converted into difference data is calculated by the procedures of the method of the third embodiment.

Conversion according to the third embodiment is applicable not only to an LUT reduced by conversion according to the second embodiment, but also to a difference table.

These procedures can further increase the compression ratio.

The present invention may be applied to a system including a plurality of devices (e.g., a host computer, interface device, reader, and printer) or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the program codes and the storage medium which stores the program codes constitute the present invention.

The present invention also includes a case where an OS (Operating System) or the like running on the computer performs some or all of actual processes on the basis of the instructions of the program codes and thereby implements the functions of the above-described embodiments. Furthermore, the present invention is also applied to a case where the program codes read out from the storage medium are written in the memory of a function expansion card inserted into the computer or the memory of a function expansion unit connected to the computer. In this case, the CPU of the function expansion card or function expansion unit performs some or all of actual processes on the basis of the instructions of the written program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-043160, filed Feb. 20, 2006, which is hereby incorporated by reference herein in its entirety.

What is claimed is:

1. A table compression method, the method comprising:
generating a difference table by calculating difference data between data stored in a first conversion table and data stored in a second conversion table which has the same number of axes and the same number of grid points of respective axes as those of the first conversion table;
compressing the difference table generated by calculating the difference data between the data stored in the first conversion table and the data stored in the second conversion table to generate compressed data;
comparing an amount of the generated compressed data with an amount of data obtained by compressing the second conversion table, and
storing, in a storage medium, the generated compressed data if the amount of the generated compressed data is smaller than the amount of data obtained by compressing the second conversion table.

2. An information processing apparatus, comprising:
a decoder which decodes compressed data which is generated by
generating a difference table by calculating difference data between data stored in a first conversion table and data stored in a second conversion table which has the same number of axes and the same number of grid points of respective axes as those of the first conversion table,
compressing the difference table generated by calculating the difference data between the data stored in the first conversion table and the data stored in the second conversion table to generate compressed data;
comparing an amount of the generated compressed data with an amount of data obtained by compressing the second conversion table, and
storing, in a storage medium, the generated compressed data if the amount of the generated compressed data is smaller than the amount of data obtained by compressing the second conversion table,
a color conversion unit which performs color conversion for an image using a conversion table decoded by the decoder.

3. A table compression apparatus comprising:
a generation unit that generates a difference table by calculating difference data between data stored in a first conversion table and data stored in a second conversion table which has the same number of axes and the same number of grid points of respective axes as those of the first conversion table;
a compression unit that compresses the difference table generated by calculating the difference data between the data stored in the first conversion table and the data stored in the second conversion table to generate compressed data;

a comparison unit that compares an amount of the generated compressed data with an amount of data obtained by compressing the second conversion table, and a storage unit that stores, in a storage medium, the generated compressed data if the amount of the generated compressed data is smaller than the amount of data obtained by compressing the second conversion table.

4. The method according to claim 1, further comprising storing information in the storage medium, the information representing that the second conversion table is converted into the difference table between the first conversion table and the second conversion table.

\* \* \* \* \*